United States Patent [19]

Tanaka

[11] Patent Number: 5,430,283
[45] Date of Patent: Jul. 4, 1995

[54] BAR-CODE SYMBOL READING APPARATUS

[75] Inventor: Hisakatsu Tanaka, Tokyo, Japan
[73] Assignee: Olympus Optical Co., Ltd., Tokyo, Japan
[21] Appl. No.: 117,784
[22] Filed: Sep. 7, 1993
[30] Foreign Application Priority Data

Sep. 10, 1992 [JP] Japan .................. 4-241929

[51] Int. Cl.⁶ .............................................. G06K 7/10
[52] U.S. Cl. ...................................... 235/462; 382/295
[58] Field of Search .................. 348/94, 95, 141, 142;
H04N 5/30; 382/45, 59; 235/470, 471, 462

[56] References Cited

U.S. PATENT DOCUMENTS

| | | | |
|---|---|---|---|
| 3,902,047 | 8/1975 | Tyler et al. | 235/471 |
| 4,369,361 | 1/1983 | Swartz et al. | 235/470 |
| 4,948,955 | 8/1990 | Lee et al. | 235/462 |
| 4,958,064 | 9/1990 | Kirkpatrick | 235/470 X |
| 5,019,699 | 5/1991 | Koenck | 235/470 X |
| 5,140,141 | 8/1992 | Inagaki et al. | 235/470 X |
| 5,155,343 | 10/1992 | Chandler et al. | 235/470 X |
| 5,181,823 | 1/1993 | Hussey et al. | 414/730 |
| 5,233,168 | 8/1993 | Kulik | 235/470 X |
| 5,319,181 | 6/1994 | Shellhammer et al. | 235/462 |
| 5,329,105 | 7/1994 | Klancnik et al. | 235/462 |
| 5,343,028 | 8/1994 | Figarella et al. | 235/462 |

FOREIGN PATENT DOCUMENTS

| | | | |
|---|---|---|---|
| 53-3885 | 2/1978 | Japan . | |
| 63-220381 | 9/1988 | Japan . | |
| 2-23483 | 1/1990 | Japan . | |
| 404078993 | 3/1992 | Japan | 235/470 |

*Primary Examiner*—Donald Hajec
*Assistant Examiner*—Jeffrey R. Filipek
*Attorney, Agent, or Firm*—Frishauf, Holtz, Goodman & Woodward

[57] ABSTRACT

In the data processing circuit of a decoder box, the position sensing circuit senses the position of the bar-code symbol imaged by a video camera in the imaging area of the video camera on the basis of the output of the frame memory. Then, the shift direction judging section of the data processing circuit determines the direction in which the bar-code symbol imaged by the video camera is shifted with respect to the imaging area of the video camera on the basis of the output of the position sensing section. The display control section of the data processing circuit displays the position of the bar-code symbol on a label position indicator provided on the decoder box on the basis of the judgment result of the shift direction judging section.

22 Claims, 17 Drawing Sheets

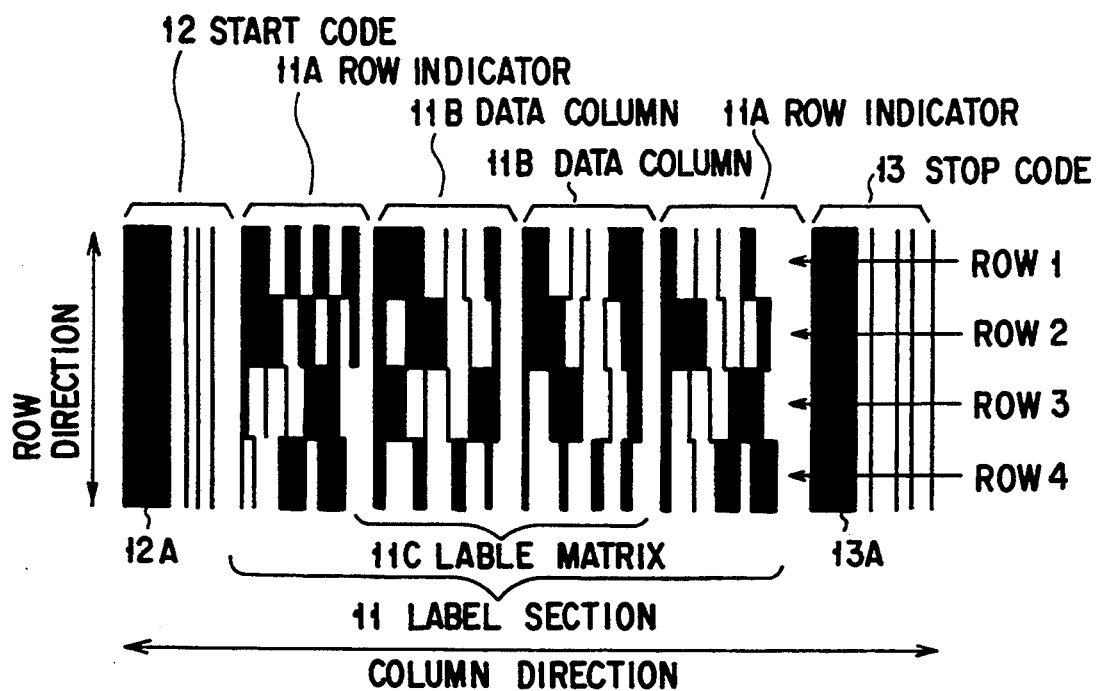
F I G. 3
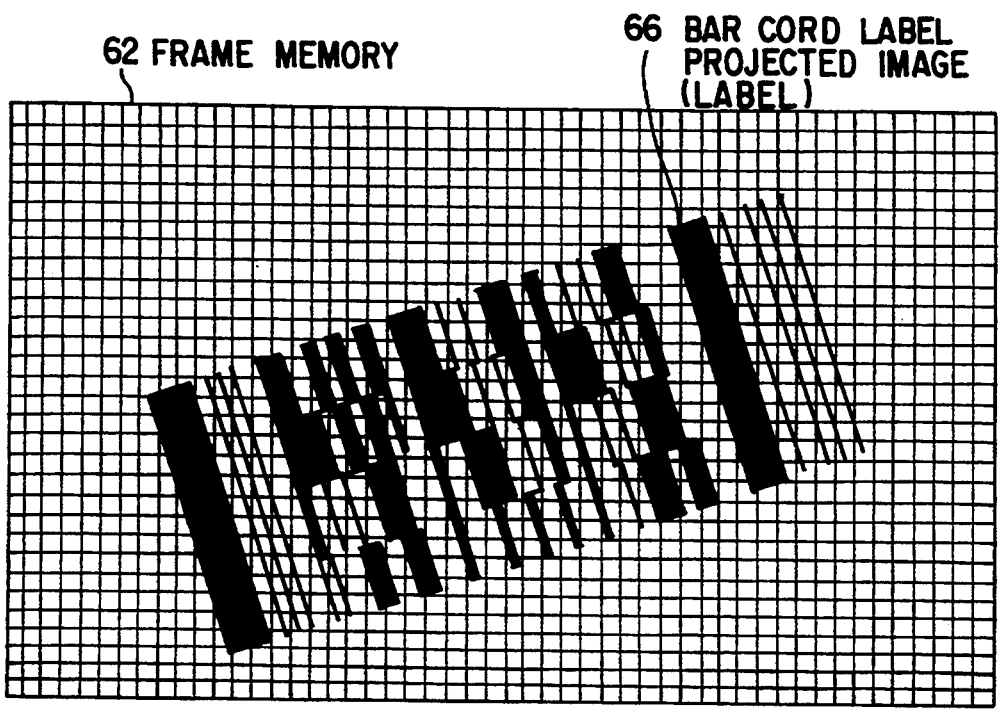
F I G. 4

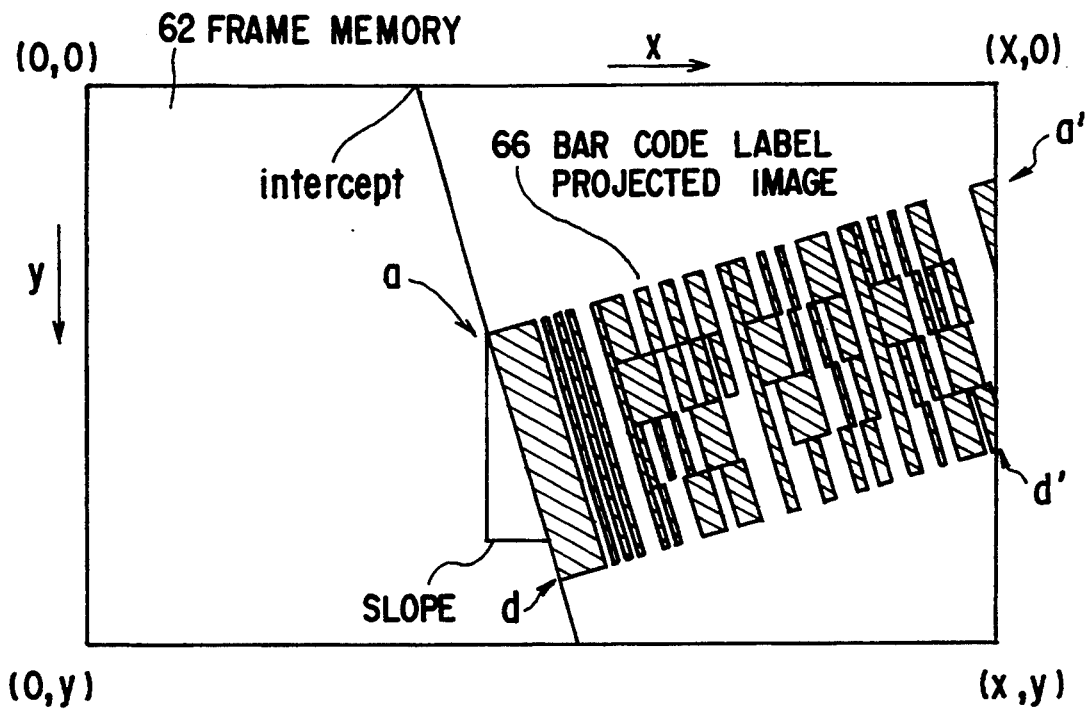
F I G. 9
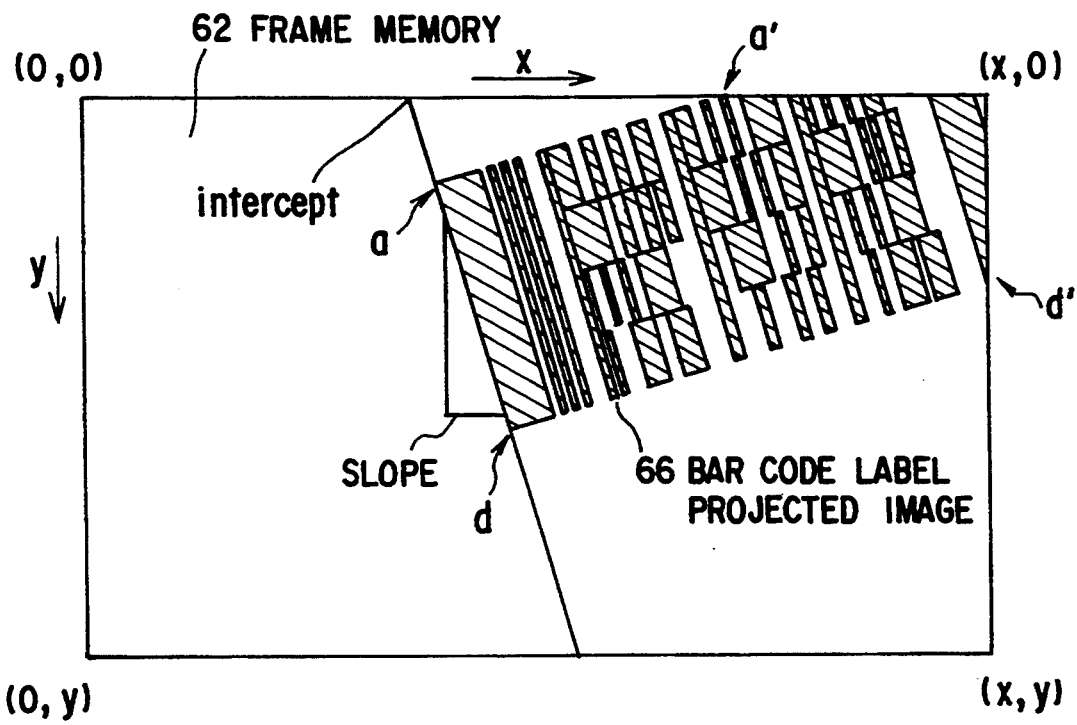
F I G. 10

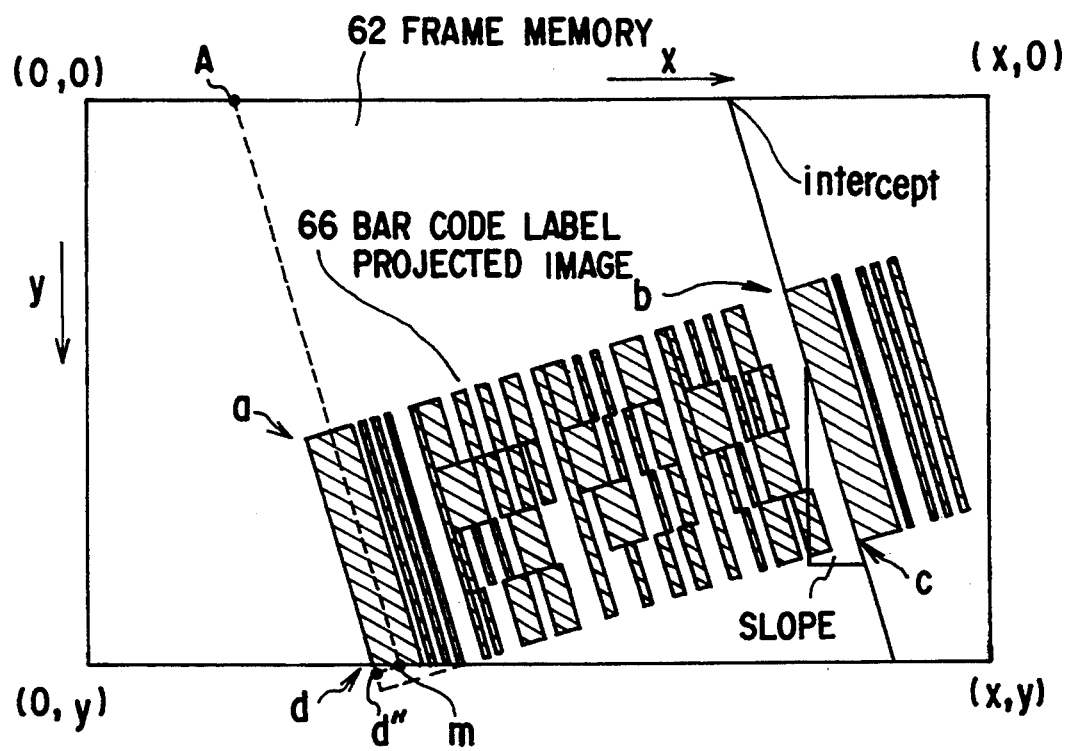
F I G. 11
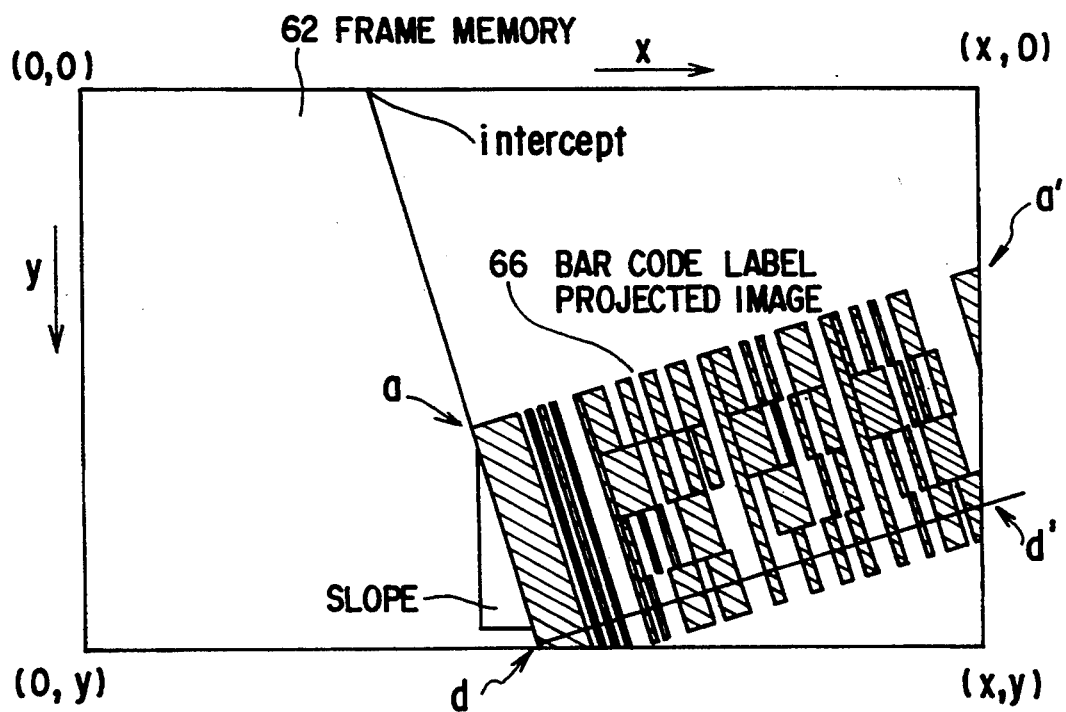
F I G. 12

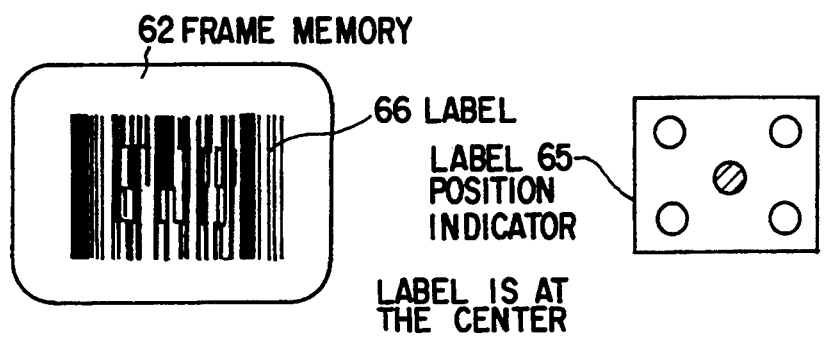
FIG. 15A — LABEL IS AT THE CENTER
FIG. 15B — LABEL IS AT THE UPPER RIGHT
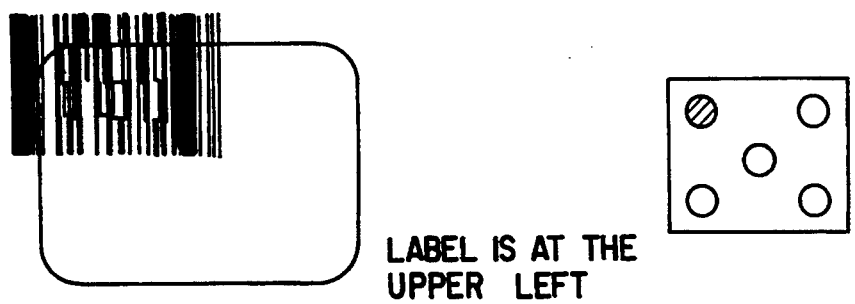
FIG. 15C — LABEL IS AT THE UPPER LEFT
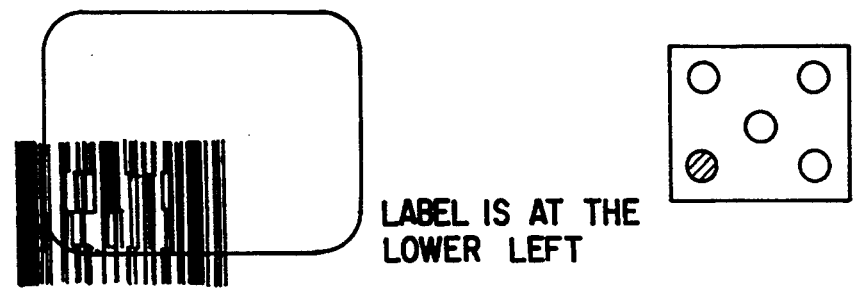
FIG. 15D — LABEL IS AT THE LOWER LEFT
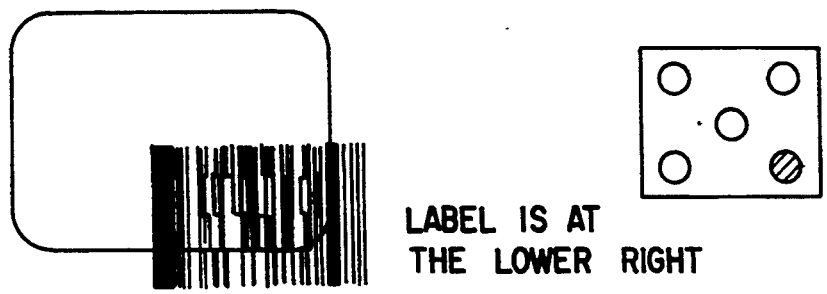
FIG. 15E — LABEL IS AT THE LOWER RIGHT FIG. 15F 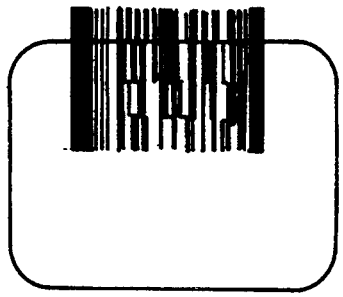 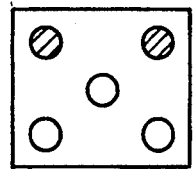
LABEL IS AT THE TOP
FIG. 15G  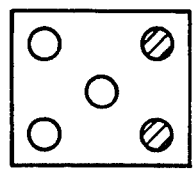
LABEL IS AT THE RIGHT
FIG. 15H 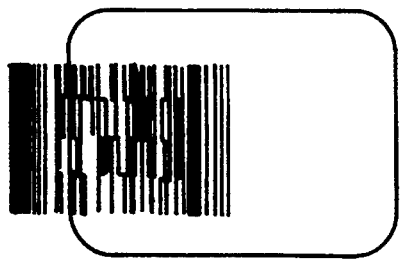 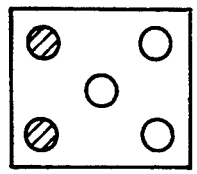
LABEL IS AT THE LEFT
FIG. 15I  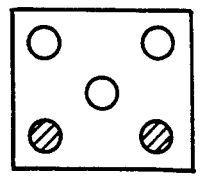
LABEL IS AT THE BOTTOM

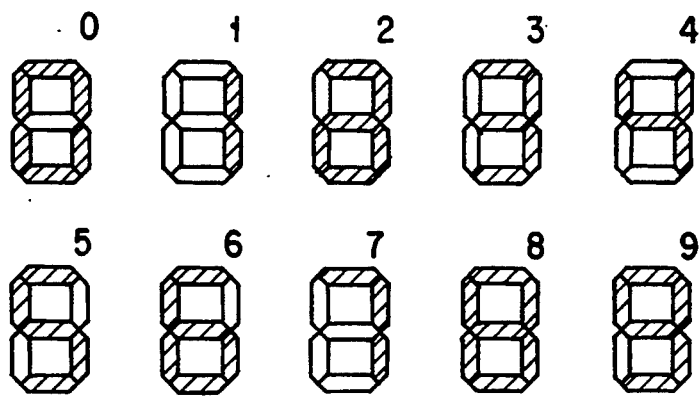
FIG. 17  LED DISPLAY ELEMENT
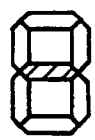 LABEL IS AT THE CENTER
FIG. 18A
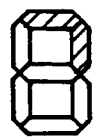 LABEL IS AT THE UPPER LEFT
FIG. 18B
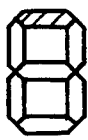 LABEL IS AT THE TOP
FIG. 18F
 LABEL IS AT THE UPPER LEFT
FIG. 18C
 LABEL IS AT THE RIGHT
FIG. 18G
 LABEL IS AT THE LOWER LEFT
FIG. 18D
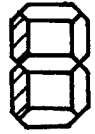 LABEL IS AT THE LEFT
FIG. 18H
 LABEL IS AT THE LOWER RIGHT
FIG. 18E
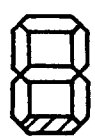 LABEL IS AT THE BOTTOM
FIG. 18I

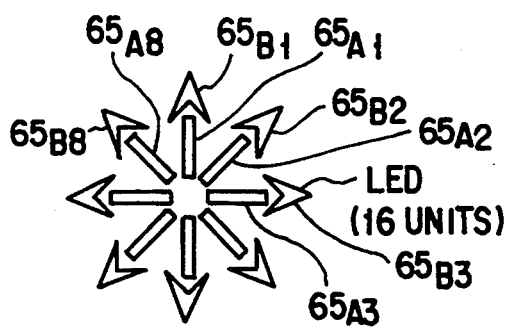
FIG. 19
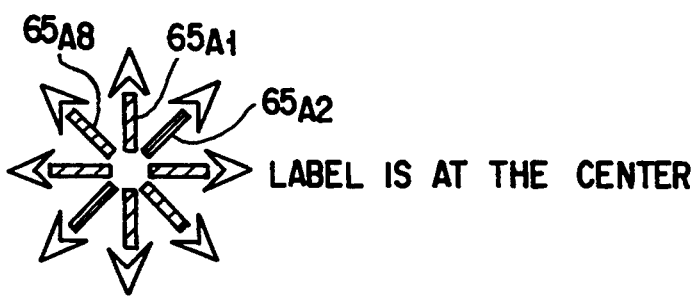
FIG. 20
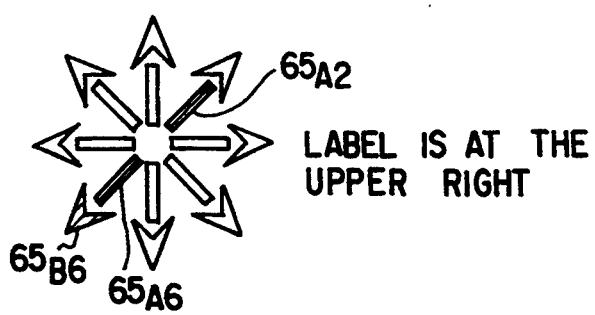
FIG. 21A
FIG. 21B

BAR-CODE SYMBOL READING APPARATUS

BACKGROUND OF THE INVENTION

1. Field of the Invention

This invention relates to a bar-code symbol reading apparatus, and more particularly to a bar-code symbol reading apparatus using a two-dimensional imaging device such as a video camera.

2. Description of the Related Art

Today, bar code symbols have been used in many countries and are available in a variety of types. Some of typical bar code symbols are JAN/UPC/EAN code, ITF (interleaved 2 of 5) code, CODE 39, NW-7 code, and CODE 128. To meet the recent demands that a bar code should carry more information and be stuck in a smaller space, two-dimensional bar code symbols with a large amount of information and a higher recording density have been proposed. Among such two-dimensional bar code symbols are CODE 16K, CODE 49, PDF 417, and DATA CODE.

There are various types of reading apparatuses for one-dimensional bar code symbols such as JAN/EAN code, ITF (interleaved 2 of 5) code, CODE 39, NW-7 code, CODE 128. The reading techniques for such one-dimensional code symbols have already been established. Some of typical types of such apparatuses are a pen type, a touch type, and a laser type. On the other hand, there are presently few types of apparatuses for two-dimensional bar-code symbols and reading techniques for reading these symbols have not been established yet.

The fundamentals of two-dimensional bar-code symbol reading techniques are almost the same as those of conventional one-dimensional bar-code symbol reading techniques. Specifically, light is projected from a light source onto a bar code symbol and the reflected light from the symbol is gathered to a light-receiving element in the reading apparatus. The gathered signal is decoded by an electric circuit made up of a microcomputer to read the bar code symbol.

One type of two-dimensional bar-code symbol reading apparatuses is a stand type (a fixed type). In this type, a bar-code symbol reading apparatus is secured and the operator puts a bar-code symbol-recorded sheet or article under the reading apparatus and has the apparatus read the symbol.

The stand-type bar-code symbol reading apparatus comprises a camera stand, a decoder box, and a monitor.

The camera stand is composed of a video camera, supports for propping up the video camera, and a base plate on which the operator is to place a bar-code symbol-recorded sheet or article.

The decoder box receives the output of the video camera via a camera cable, decodes the video camera output signal into the contents of the recorded bar code symbol, and transfers the contents to a host computer, a terminal equipment, or the like.

The monitor receives the video output of the decoder box and is used for the operator to make sure that the bar code symbol recorded on the sheet or article is completely within the field of view of the video camera. The monitor is necessary when a bar code symbol is large.

With such an apparatus where the bar code symbol recorded on the sheet or article is checked on the monitor to see if it is completely within the field of view of the video camera, the operator must judge whether or not the bar code symbol is within the field of view, while watching the monitor screen. The criterion of the judgment differs widely from operator to operator; even if they look at the same screen display, an operator may proceed to perform the decoding process without the slightest hesitation but another operator may place the bar-code symbol-recorded sheet or article again correctly. In the former case, even if decoding cannot be effected, the operator starts the decoding process and, when he hears the buzzer sound to inform him that decoding cannot be effected, he places the bar-code symbol-recorded sheet or article again, with the result that the time spent in decoding is wasted. In the latter case, even if the bar code symbol is not completely within the field of view of the video camera or is partly out of the field, the decoding can sometimes be effected. In this case, the operator places the bar-code symbol-recorded sheet or article again although the decoding can be achieved, with the result that the time and labor required for replacement is wasted.

SUMMARY OF THE INVENTION

Accordingly, the object of the present invention is to provide a two-dimensional bar code symbol reading apparatus capable of judging whether or not a bar code symbol recorded on a sheet or an article or the like is completely within the field of view of a video camera without differences between individuals.

The foregoing object is accomplished by providing a bar-code symbol reading apparatus comprising: imaging means for imaging a bar-code symbol consisting of bars and spaces; memory means for storing the image information on a bar-code symbol from the imaging means; position sensing means for sensing the position of the bar-code symbol imaged by the imaging means in the imaging area of the imaging means on the basis of the output of the memory means; and direction judging means for judging the direction of shift of the bar-code symbol imaged by the imaging means from the imaging area of the imaging means, on the basis of the output of the position sensing means.

with a bar-code symbol reading apparatus according to the present invention, the position sensing means, on the basis of the output of the memory means, senses the position of the bar-code symbol imaged by the imaging means in the imaging area of the imaging means. According to the output of the position sensing means, the direction judging means judges a direction in which the bar-code symbol imaged by the imaging means is shifted from the imaging area of the said imaging means.

Then, the shift direction of the bar-code symbol determined by the direction judging means is outputted to, for example, the bar-code symbol position display unit, which prompts the operator to correct the position of the bar-code symbol, only when necessary.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows the structure of a PDF-417 bar-code symbol as an example of a two-dimensional bar code symbol;

FIG. 4 is a pictorial view of a PDF-417 bar-code symbol image projected on a frame memory;

FIG. 9 is a view of a label image projected on the frame memory when sticking out rightward;

FIG. 10 is a view of a label image projected on the frame memory when sticking out to the upper right;

FIG. 11 is a view of a label image projected on the frame memory when sticking out downward;

FIG. 12 is a view of a label image projected on the frame memory when sticking out to the upper left;

FIGS. 15A through 15I show the display states of the label position indicator of FIG. 14 corresponding to the states of the label sticking out, respectively;

FIG. 17 is a view of a 7-segment LED as still another example of the label position indicator;

FIGS. 18A through 18I show the display states of the 7-segment LED of FIG. 17 corresponding to the states of the label sticking out, respectively;

FIG. 19 is a view of another example of the label position indicator;

FIG. 20 is a view of still another example of the label position indicator;

FIGS. 21A through 21I show the display states of the label position indicator of FIG. 20 corresponding to the states of the label sticking out, respectively;

DETAILED DESCRIPTION OF THE PREFERRED EMBODIMENT

[First embodiment]

Figure 1:
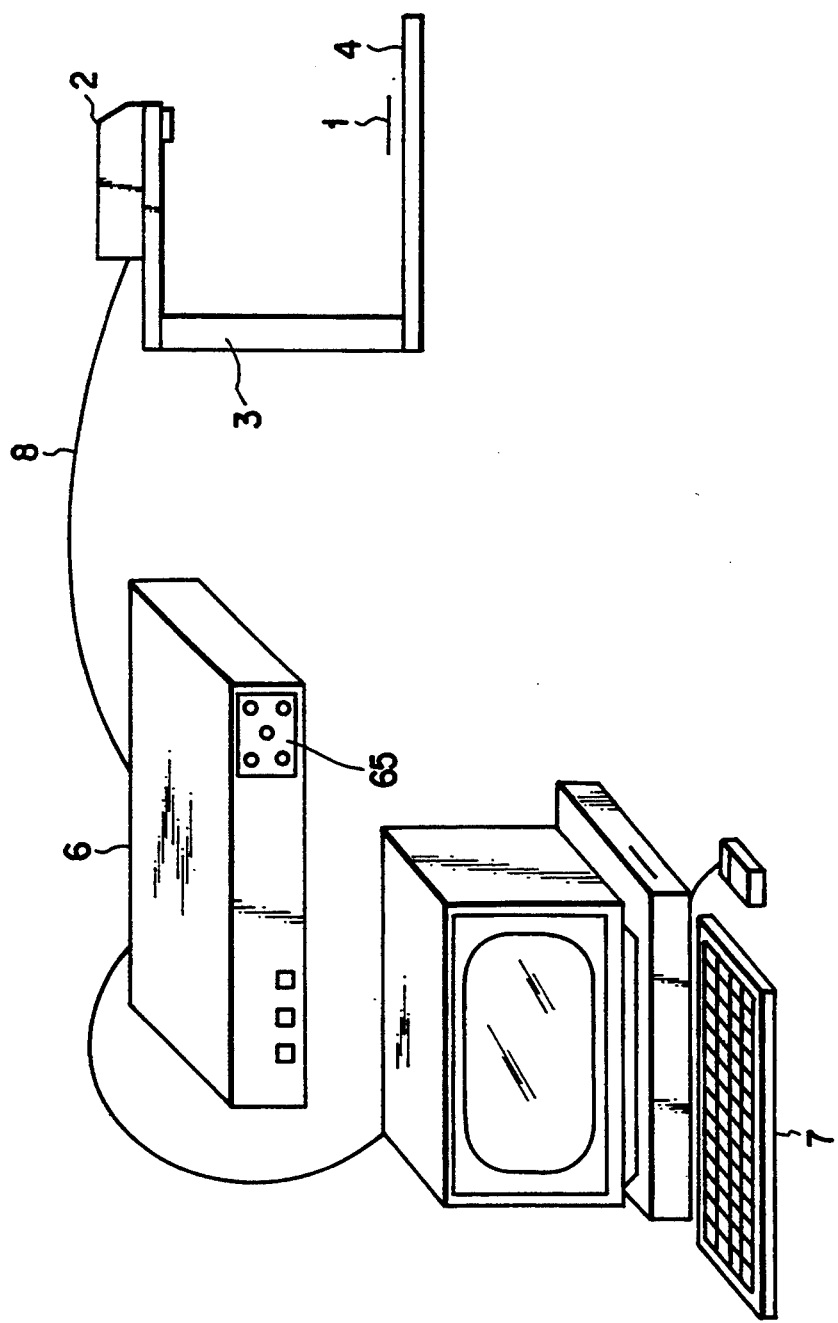
FIG. 1 is an external view of a first embodiment of the present invention.
Figure 2:
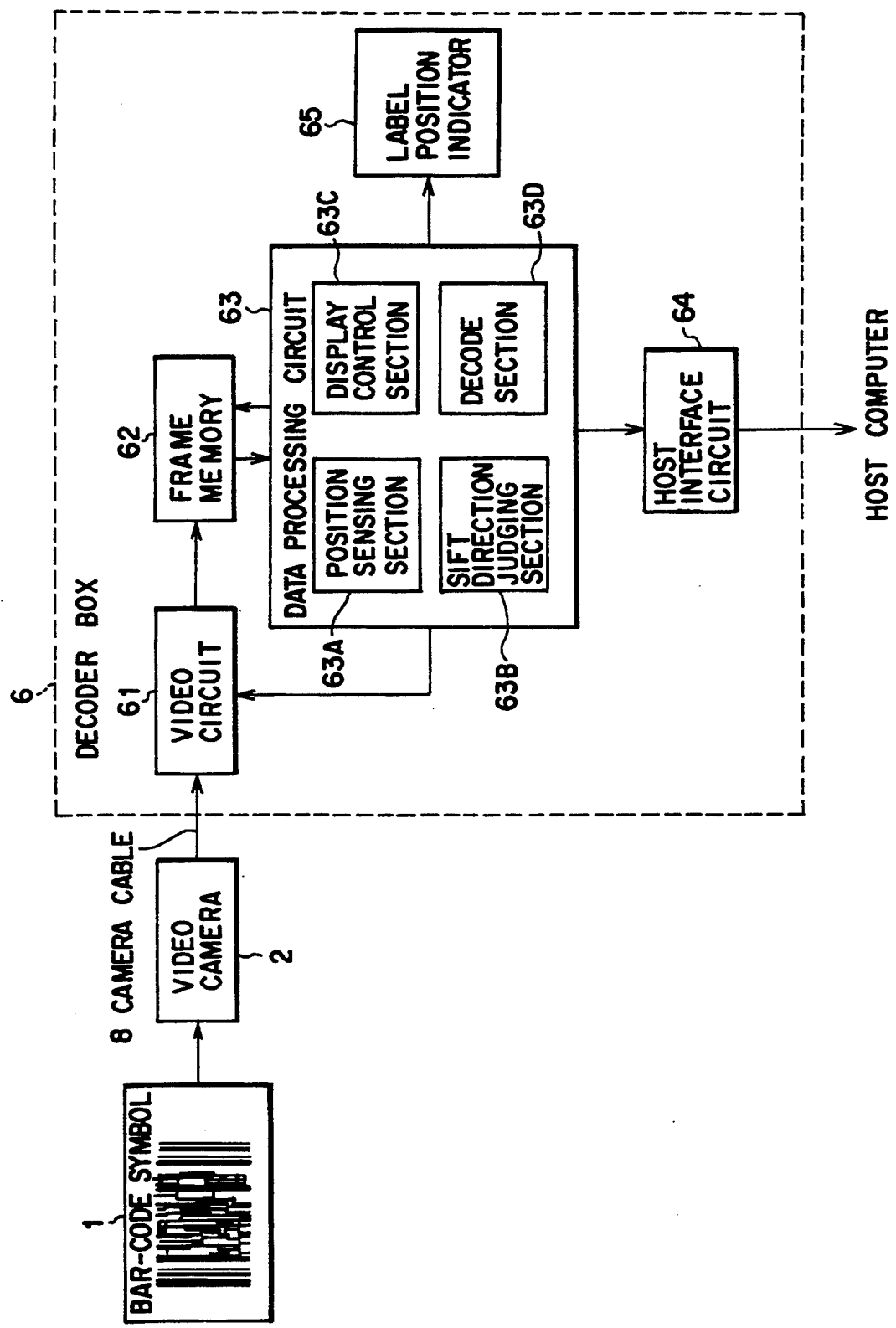
FIG. 2 is a block diagram of the first embodiment.

FIG. 1 is an external view of a bar-code symbol reading apparatus according to a first embodiment of the present invention. FIG. 2 is its block diagram.

The bar-code symbol reading apparatus of this embodiment comprises a camera stand 5 and a decoder box 6. The camera stand 5 is composed of a video camera 2, a column 3 for supporting the video camera 2, and a base plate 4 on which a sheet or an article on which a bar-code symbol 1 is recorded is placed. The decoder box 6 receives the output of the video camera 2 via a camera cable 8, senses the position of the bar-code symbol from the video camera output signal, and causes a label position indicator 65 to display the position of the bar-code symbol. It also decodes the contents of the recorded bar-code symbol 1 and transfers the decode result to a host computer 7 or a terminal equipment (not shown).

The decoder box 6 incorporates the electric circuitry as shown in FIG. 2. Specifically, the decoder box 6 is made up of a video circuit 61, a frame memory 62, a data processing circuit 63, a host interface circuit 64, and a label position indicator 65. The data processing circuit 63 has the functions of a position sensing section 63A, a shift direction judging section 63B, a display control section 63C, and a decode section 63D.

The operation of the bar-code symbol reading apparatus thus constructed will be described in detail, referring to the block diagram of FIG. 2.

A lighting system (not shown) illuminates a sheet or an article containing a bar-code symbol 1 and its reflected light is directed to the video camera 2 (see FIG. 1). The video camera 2 converts the optical signal into an electric signal, adds a synchronizing signal etc. to the electric signal to form a video signal, and sends the video signal to the video circuit 61 in the decoder box 6 via the camera cable 8.

The video circuit 61 separates the synchronizing signal from the video signal and digitizes the resulting signal by analog/digital conversion. The digitized signal is stored in the frame memory 62.

Then, the position sensing section 63A of the data processing circuit 63 scans the image of the sheet containing the bar-code symbol 1 stored in the frame memory 62 to read the image information from the frame memory 62. It then senses whether or not the bar-code symbol 1 is within the screen frame of the frame memory 62 or within the field of view (imaging area) of the video camera 2. If the bar-code symbol 1 is within the field of view, it further senses the position of the bar-code symbol 1 within the field of view. After the position of the bar-code symbol 1 has been sensed, the shift direction judging section 63B of the data processing circuit 63 judges in which direction the position of the bar-code symbol 1 is shifted within the field of view of the video camera 2. Then, on the basis of the result of judging the shift direction, the display control section 63C of the data processing circuit 63 outputs the position of the bar-code symbol 1 to the label position indicator 65. Further, the decode section 63D of the data processing circuit 63 decodes the bar-code symbol 1.

After the decode section 63D has successfully decoded the bar-code symbol 1, the data processing circuit 63 controls the host interface circuit 64 so as to transfer the decoded information to the host computer 7 or terminal equipment (not shown) in FIG. 1. Here, the data processing circuit 63 also outputs to the video circuit 61 a take-in start signal for taking an image into the frame memory 62.

Referring to FIG. 3, the structure of the bar-code symbol 1 will be explained briefly. Here, a two-dimensional bar-code symbol of the PDF-417 code system is used as a bar-code symbol.

FIG. 3 shows the label structure of the PDF-417 code system. The bar-code symbol 1 contains a label section 11 which is an area of information components to be decoded, composed of bar-code character groups consisting of bars and spaces, as well as a start code 12 and a stop code 13, serving as a start character and a stop character, placed before and after the label section. A single code is made up of four bars and four spaces except for the stop code 13. The stop code 13 is formed of five bars and four spaces. The start and stop codes 12 and 13 begin with thick bars 12A and 13A called big bars, respectively.

The label section 11 is composed of codes called row indicators 11A adjacent to the start code 12 and the stop code 13, and a label matrix 11C therebetween consisting of plural data columns 11B in which the actual data is written. In the row indicators 11A, the label size in the row and column directions, security level, and others are written. In this context, the "security level" means the level of the ability of the PDF-417 code system to correct an error. The PDF-417 code system has nine security levels. Thus, by decoding information on the row indicators, the size of the bar-code symbol information etc. can be determined.

FIG. 3 shows a bar-code symbol having a 4×2 label matrix.

FIG. 4 is a pictorial view of a bar-code symbol image of the PDF-417 code system having a 4×1 label matrix hypothetically projected onto the pixel array of the frame memory 62. Hereinafter, an image of the bar-code symbol 1 projected onto the frame memory 62 is referred to as a bar-code label 66. For example, to sense the label 66 means to sense a bar-code symbol from the image of the bar-code symbol 1 projected onto the frame memory 62. Here, a square in the figure represents not a single pixel but a set of n×n pixels.

The data processing circuit 63, based on the algorithm explained below, senses a label, reads and decodes the label information, and transfers the decode result to the host computer 7 or terminal equipment.

Figure 5:
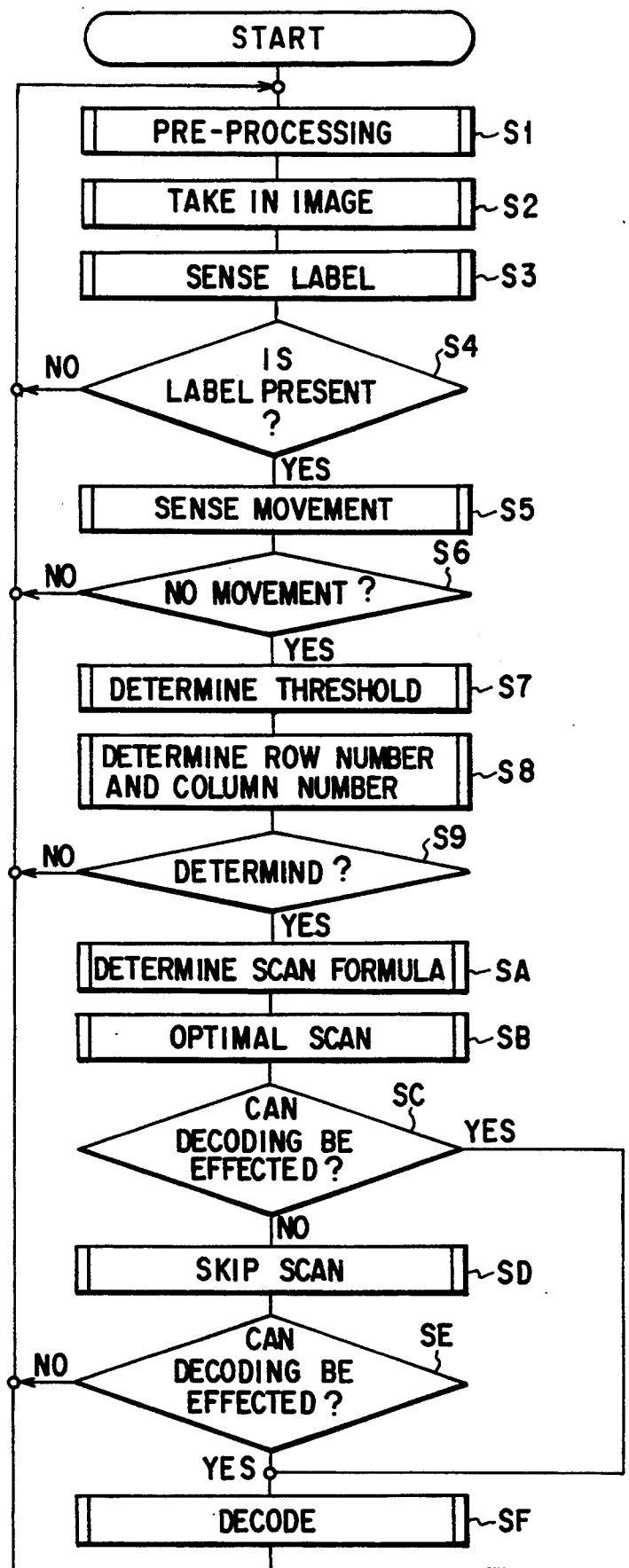
FIG. 5 is a general flowchart for the algorithm for the operation of the data processing circuit.

FIG. 5 is a flowchart generally showing the algorithm for the operation of the data processing circuit 63. In this description, the flowcharts are based on the notational convention of the C programming language.

A preprocessing routine is called (step S1) and various parameters are initially set. Then, an image take-in routine is called (step S2). In the image take-in routine, a take-in start signal is outputted to the video circuit 61 and images are successively taken in two screens (Bank0 and Bank1) of the frame memory 62. The frame memory 62 has two screens of memory capacity. In this context, "successively" means that image data of one screen is stored in Bank0 and then image data of one screen is stored in Bank1. In this case, after a take-in signal has been outputted, the latest frame data is taken in Bank0. After the frame data has been taken in Bank0, another take-in signal is outputted and the latest frame data is taken in Bank1. Consequently, a time lag in image pickup is present between the data items of the two screens (the time lag is expressed by (the time needed to store data in Bank0)+(0 to 1/30 second)).

Next, a label sensing routine (described later in detail) is called (step S3). Using Bank0 of the taken-in image data, a check is made to see if a label is present. If a label is present, the label information is sensed and further the position of the label is determined. The label position is displayed on the label position indicator 65. Looking at the label position indicator 65, the operator can confirm whether the label is completely out of the field of view of the video camera 2, or is shifted to the right or the left, so that he can move the sheet or article containing the bar-code symbol 1 to a proper position. Then, the result of the label sensing process in step S3 is judged (step S4). If there is no label, control is returned to step S1 and the preprocessing routine is called.

On the other hand, if a label is present, a movement sensing routine is called (step S5) and the influence of movement is estimated by further using Bank1 of the image data taken in step S2. In this context, the word "movement" means a movement of an image which frequently occurs when a sheet or article containing the bar-code symbol 1 is placed above the bar-code symbol reading apparatus. The result of the movement sensing in step S5 is judged (step S6). If a movement has occurred, control is returned to step S1, and the preprocessing routine is called.

If no image movement is sensed, a threshold determining routine is called (step S7), and a threshold used in a process of extracting inter-edge width information from line data to be processed, is determined in an optimal scanning routine in step SB and a skip scanning routine in step SD. Next, a row-number and column-number determining routine is called (step S8), and the row indicator 11A of the label 66 is read to determine the label size etc. Then, it is judged whether the label size etc. have been determined in the determining routine in step S8 (step S9). If the label size etc. have not been determined, control is returned to step S1 and the preprocessing routine is called.

On the other hand, when the label size etc. have been determined, a scan formula determining routine is called (step SA), and various variables for scanning the entire surface of the label 66 are defined. Next, the optimal scanning routine is called (step SB). Using the variables defined in step SA, the entire surface of the label is scanned at optimal intervals to read the label information. In this context, the word "optimal scanning" means scanning at optimal intervals to obtain all label information with a minimum amount of calculations, when there is no defect in the label. It is judged whether the decoding can be effected on the basis of the information read by the optimal scanning in step SB (step SC). If the decoding can be effected, control is passed to step SF where a decoding process is performed.

If the decoding cannot be effected, a skip scanning routine is called (step SD). In the skip scanning routine, the entire surface of the label is scanned using the variables defined in step SA and the label information is read. Then, it is judged whether or not it is possible to decode the information read in step SD (step SE). If the decoding can be effected, control is passed to step SF where a decoding process is performed. If the decoding cannot be achieved, control is returned to step S1 and the preprocessing is called.

In step SF, the information read in the optimal scanning routine in step SB or in the skip scanning routine in step SD is checked. In this step, only the decode result may be checked (in the case of a conventional one-dimensional bar code such as JAN/UPC/EAN code, ITF (Interleaved 2 of 5) code, CODE 39, NW-7 code, or CODE 128) or, in addition to the checking of the decode result, an error may be corrected if any (in the case of a two-dimensional bar-code symbol such as PDF-417 or DATA CODE). Then, in step SF, the host interface circuit 64 is controlled so as to transfer the information read to the host computer 7 or terminal equipment.

The details of each routine have been presented in pending U.S. patent application Ser. No. 066,968, filed May 25, 1993, invented by Kubo and assigned to the assignee of the present invention. Its contents are included in the present invention.

Figure 6:
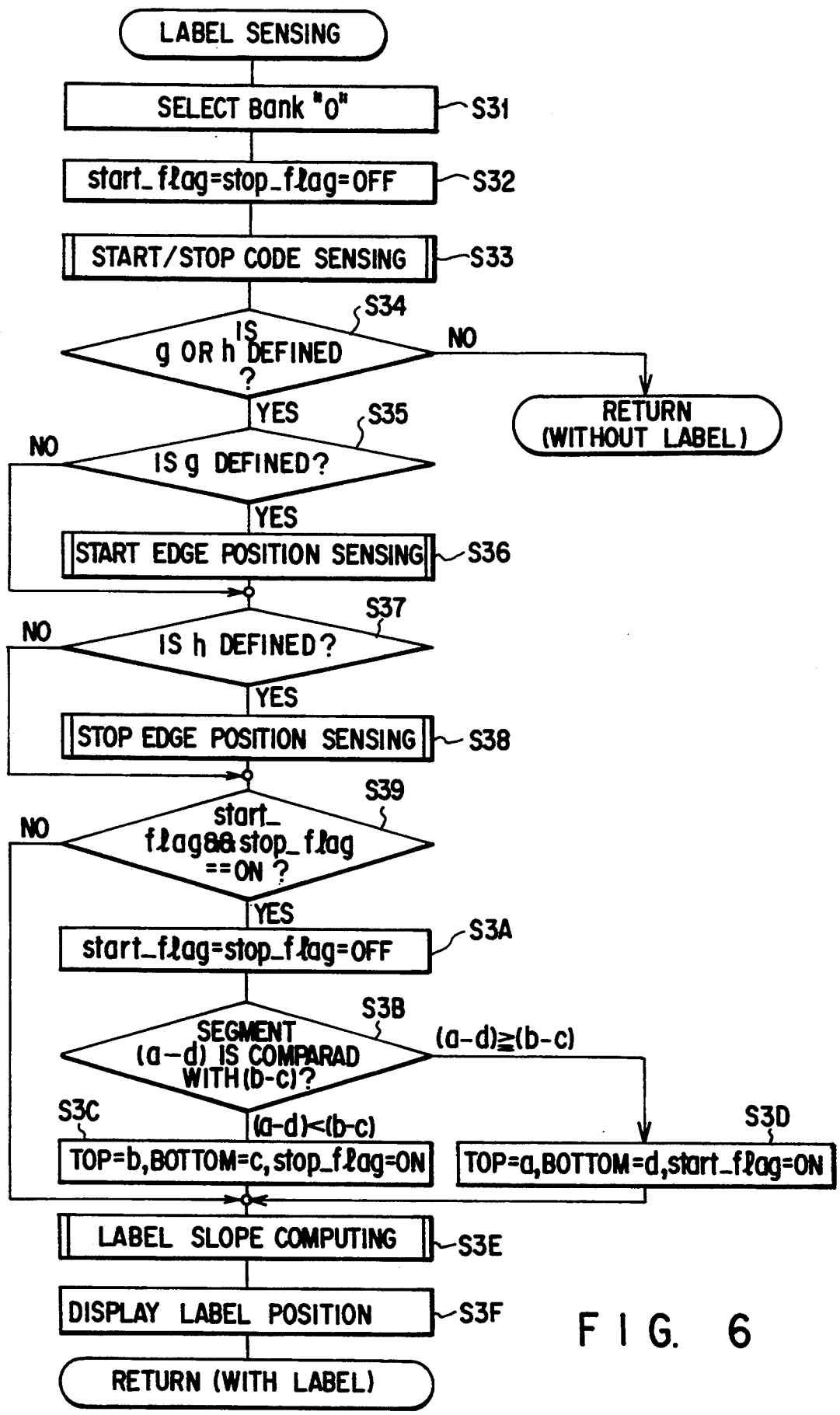
FIG. 6 is a flowchart for the label sensing routine in FIG. 5.

Therefore, only the label sensing routine called in step S3, which is a unique section of this embodiment and differs from what is disclosed in pending U.S. patent application Set. No. 066,968, will now be described with reference to the flowchart of FIG. 6 and the view of FIG. 7 of a label projected image. The label sensing routine includes two types of label sensing processes: the sensing of the presence/absence of a label and the sensing of label position information, that is, the determining of an extracting range (variables TOP and BOTTOM) for extracting the image data from the frame memory 62 so as to be parallel to the label as well as the slope of the label (variable SLOPE). Here, the value of variable TOP indicates the top coordinates of the label and the contents of variable BOTTOM indicate the bottom coordinates of the label. The contents of variable SLOPE represent the slope of the label.

In the label sensing routine, the image information in Bank0 of the frame memory 62 is selected as an object to be processed (step S31). Then, the label sensing flag is initialized (step S32). The label sensing flag is composed of a start sensing flag "start_flag" and a stop sensing flag "stop_flag." These label sensing flags are used to indicate which of the start code 12 and the stop code 13 should be selected and processed in a process explained later. This is because when both of the start code 12 and the stop code 13 are sensed, the more reliable one must be selected.

Figure 7:
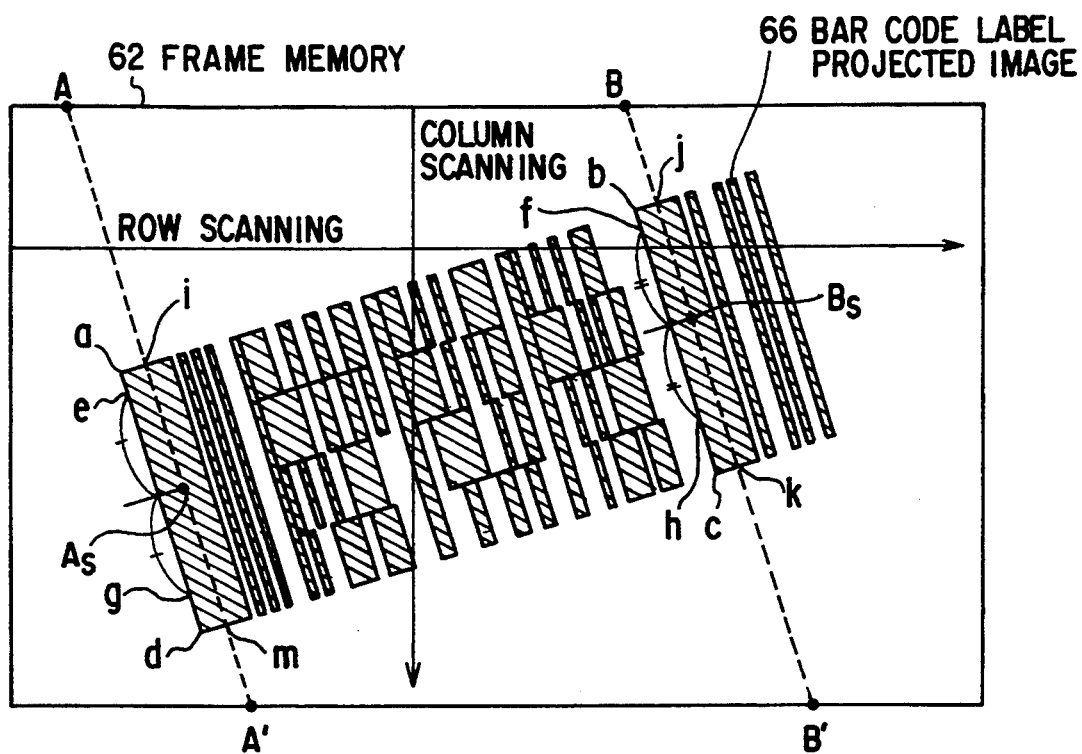
FIG. 7 is a view of a label image projected on the frame memory by way of explaining how to sense a label.

Next, a start/stop code sensing routine is called (step S33) to sense whether or not the image data stored in Bank0 of the frame memory 62 contains a start code 12 and/or a stop code 13. That is, coordinates e, f, g, and h in FIG. 7 are sensed (all the four coordinate variables are not necessarily sensed; for example, in the case of FIG. 8, coordinate variables f and h may not be obtained). If a start and a stop code are sensed and determined by this routine, coordinate variable g on the frame memory 62 in FIG. 7 is defined for the start code 12, and coordinate variable h is defined for the stop code 13. Here, coordinate variable e indicates the coordinates at which the start code 12 is first found, f the coordinates at which the stop code 13 is first found, g the coordinates at which the start code 12 is last found, and h the coordinates at which the stop code 13 is last found.

Then, it is judged whether or not one of coordinates g and h is defined (step S34), and if not, it is determined that there is no label and control escapes from this processing. That is, control returns with the information that there is no label. Although in this specification, the flowchart is drawn as shown in the figure because the flow is written according to the notational conventions of the C language, the conventions of FORTRAN would produce a different flowchart in which return is made after a no-label flag is set up.

In the way described above, whether a label is present or not is sensed.

Next, performed is the sensing of label position information, that is, the computing of an extracting range (variables TOP and BOTTOM) for extracting the image data from the frame memory 62 so as to be parallel to the label as well as the slope of the label (variable SLOPE).

Specifically, in step S34, if it is judged that one of coordinates g and h is defined, it is judged whether or not coordinate variable g is defined (step S35). If not, control proceeds to step S37. If coordinate variable g is defined, a start edge position sensing routine (explained later in detail) is called (step S36) to sense the start edge position. The start edge sensing defines coordinate variables i and m as shown in FIG. 7 on the basis of coordinate variables e and g (when coordinate variable g has been defined, then naturally coordinate variable e has also been defined), and further coordinate variables a and d. In addition, "start_flag" is set and coordinate variables TOP and BOTTOM are defined. Here, each of coordinate variables a and d indicates one of the coordinates of the four corners of the label.

Next, it is judged whether or not coordinate variable h is defined (step S37), and if not, control goes to step S39. If coordinate variable h is defined, a stop edge position sensing routine (explained later in detail) is called (step S38) to sense the stop edge position. The stop edge position sensing defines coordinate variables as shown in FIG. 7 on the basis of coordinate variables j and k as shown in FIG. 7 on the basis of coordinate variable f and h (when coordinate variable h has been defined, then coordinate variable f has also been defined), and further coordinate variables b and c. Additionally, "stop_flag" is set and coordinate variables TOP and BOTTOM are defined. Here, each of coordinate variables b and c indicates one of the coordinates of the four corners of the label.

Next, it is judged whether or not both of "start flag" and "stop flag" are on (step S39) If none of them are on, control proceeds to step S3E. Here, the symbol "&&" means logical product.

If both flags are on, both of "start flag" and "stop_flag" are reset once (step S3A). Then, segment (a-d) is compared with segment (c-d) (step S3B), and either the start code 12 or the stop code 13 whose segment is longer than the other is selected as that to be processed. The longer one is selected as a reference in processing since the main reason why one code becomes shorter than the other in normal operation is that the former sometimes sticks out from the screen.

If segment (a-d) is shorter than segment (b-c), the value of coordinate variable b is substituted into coordinate variable TOP and the value of coordinate variable c is substituted into coordinate variable BOTTOM to define data to determine an extracting range of label information, and further "stop_flag" is selected and turned on (step S3C).

Conversely, if segment (a-d) is equal to or longer than segment (b-c), the value of coordinate variable a is substituted into coordinate variable TOP and the value of coordinate variable d is substituted into coordinate variable BOTTOM to define data to determine an extracting range of label information, and further "start_flag" is selected and turned on (step S3D).

Then, the label slope computing routine is called (step S3E) to obtain the label slope (variable SLOPE) from these coordinate variables TOP and BOTTOM. Up to this point, this label sensing routine is the same as that of the pending U.S. patent application Ser. No. 066,968.

Next, the position of the label 66 (the position on the frame 62) is determined from the information on coordinate variables a, d, b, and c and the determined position is outputted to the label position indicator 65 (step S3F). The step S3F will be described later in detail.

Lastly, control returns with the variables obtained in step S3E and the information that a label is present.

The start edge position sensing routine called in step S36 of the label sensing routine will now be described.

First, after the start sensing flag "start flag" is turned on, an equation for a straight line parallel to segment e-g is defined: for example, $y = a_{st}x + b_{st}$ is defined as an equation for segment e-g. Next, an intercept $b_{st}$ is defined so that the straight line may cross the start big bar 12A. After a line crossing the start big bar 12A has been obtained, the intersections of the line and the equation defining the screen (the boundary straight line of the frame memory 62) are defined as A and A' (see FIG. 7). Then, a perpendicular line is drawn from the mid-point of coordinates e and g to line A-A' and the intersection is defined as $A_s$.

Then, the image data is examined sequentially, starting at point $A_s$ to point A on line A-A' to check to see if there is an edge. If an edge is sensed, the sensed coordinates are stored in coordinate variable i. That is, the sensed coordinates are defined as point i. If no edge is sensed, the intersection of line A-A' and the equation defining the screen, or point A, is defined as point i.

Next, the image data is examined sequentially, starting this time at point $A_s$ to point A' on line A-A' to check to see if there is an edge. If an edge is sensed, the sensed coordinates are stored in coordinate variable m. That is, the sensed coordinates are defined as point m. If no edge is sensed, the intersection of line A-A' and the equation defining the screen, or point A', is defined as point m.

Then, a perpendicular line is drawn from point i indicated by coordinate variable i to the line passing points e and g indicated by coordinate variables e and g, and the coordinates of the intersection are stored in coordinate variable a. That is, an equation for a straight line meeting at right angles with line A-A' passing point i is determined, and the intersection of this line and the line passing points e and g is obtained. The intersection is then defined as point a. If the intersection is outside the screen, the intersection of the straight line passing points e and g and the equation defining the screen is defined as point a.

Similarly, a perpendicular line is drawn from point m indicated by coordinate variable m to the straight line passing points e and g indicated by coordinate variables e and g, and the coordinates of the intersection are stored in coordinate variable d. That is, an equation for a straight line meeting at right angles with line A-A' passing point m is determined, and the intersection of this line and the line passing points e and g is obtained. The intersection is then defined as point d. If the intersection is outside the screen, the intersection of the straight line passing points e and g and the equation defining the screen is defined as point d.

After the value of coordinate variable a thus obtained is stored in coordinate variable TOP and the value of coordinate variable d is stored in coordinate variable BOTTOM, control is returned to a higher-level routine.

The stop edge position sensing routine called in step S38 in the label sensing routine functions in almost the same manner as the start edge position sensing routine.

First, after the stop sensing flag "stop_flag" is turned on, an equation for a straight line parallel to segment f-h is defined: for example, $y = a_{sp}x + b_{sp}$ is defined as an equation for segment f-h. Next, an intercept $b_{sp}$ is defined so that the straight line may cross the stop big bar 13A. After a line crossing the stop big bar 13A has been obtained, the intersections of the line and the equation defining the screen are defined as B and B' (see FIG. 7). Then, a perpendicular line is drawn from the mid-point of coordinates f and h to line B-B' and the intersection is defined as $B_s$.

Then, the image data is examined sequentially, starting at point $B_s$ to point B on line B-B' to check to see if there is an edge. If an edge is sensed, the sensed coordinates are stored in coordinate variable j. That is, the sensed coordinates are defined as point j. If no edge is sensed, the intersection of line B-B' and the equation defining the screen, or point B, is defined as point j.

Next, the image data is examined sequentially, starting this time at point $B_s$ to point B' on line B-B' to check to see if there is an edge. If an edge is sensed, the sensed coordinates are stored in coordinate variable k. That is, the sensed coordinates are defined as point k. If no edge is sensed, the intersection of line B-B' and the equation defining the screen, or point B', is defined as point k.

Then, a perpendicular line is drawn from point indicated by coordinate variable j to the line passing points f and h indicated by coordinate variables f and h, and the coordinates of the intersection are stored in coordinate variable b. That is, an equation for a straight line meeting at right angles with line B-B' passing point j is determined, and the intersection of this line and the line passing points f and h is obtained. The intersection is then defined as point b. If the intersection is outside the screen, the intersection of the straight line passing points f and h and the equation defining the screen is defined as point b.

Similarly, a perpendicular line is drawn from point k indicated by coordinate variable k to the line passing points f and h indicated by coordinate variables f and h, and the coordinates of the intersection are stored in coordinate variable c. That is, an equation for a straight line meeting at right angles with line B-B' passing point k is determined, and the intersection of this line and the line passing points f and h is determined. The intersection is then defined as point c. If the intersection is outside the screen, the intersection of the straight line passing points f and h and the equation defining the screen is defined as point c.

After the value of coordinate variable b thus obtained is stored in coordinate variable TOP and the value of coordinate variable c is stored in coordinate variable BOTTOM, control is returned to a higher-level routine.

Figure 8:
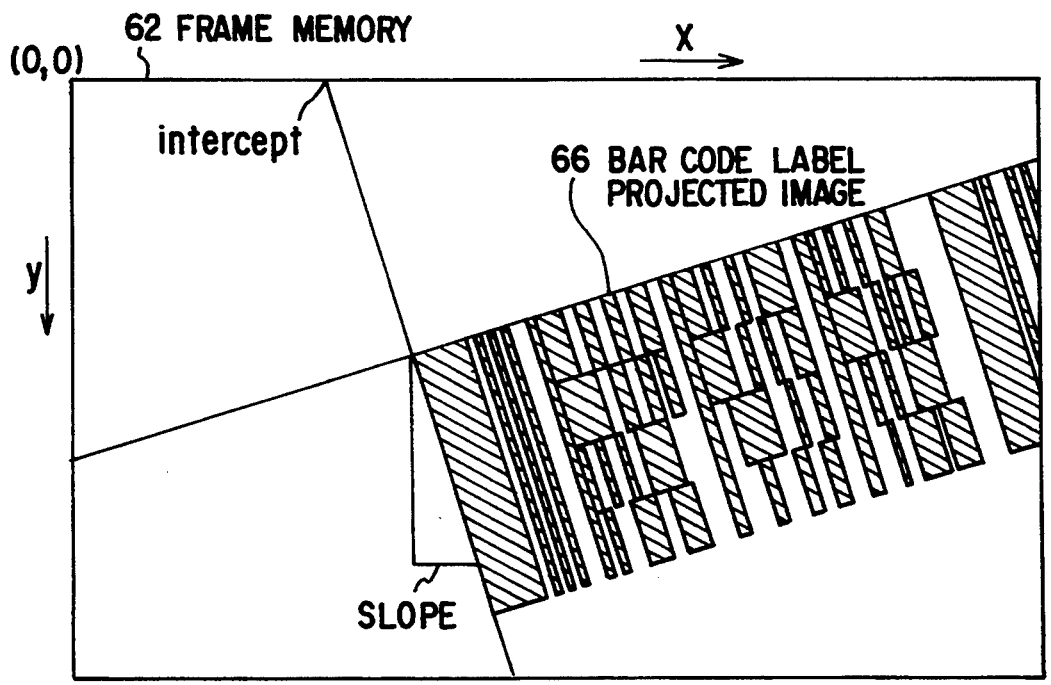
FIG. 8 is a view of a label image projected on the frame memory by way of explaining how to determine the slope of a label.

Next, the label slope computing routine called in step S3E of the label sensing routine will now be described, referring to the explanatory diagram of FIG. 8 for obtaining the slope of the label in row scanning. FIG. 8 shows an example of selecting the start code 12 as a reference in row scanning.

First, it is judged whether row scanning or column scanning is performed. If row scanning is performed, the x-coordinate value of coordinate variable BOTTOM is divided by the result of subtracting the y-coordinate value of coordinate variable TOP from the y-coordinate value of coordinate variable BOTTOM, and the x-coordinate value of coordinate variable TOP is divided by the result of subtracting the y-coordinate value of coordinate variable TOP from the y-coordinate value of coordinate variable BOTTOM, and then the difference between these two quotients is stored in slope variable SLOPE. Next, the result of multiplying y-coordinate of coordinate variable BOTTOM by x-coordinate of coordinate variable TOP is divided by the result of subtracting the y-coordinate value of coordinate variable TOP from the y-coordinate value of coordinate variable BOTTOM, and the result of multiplying x-coordinate of coordinate variable BOTTOM by y-coordinate of coordinate variable TOP is divided by the result of subtracting the y-coordinate value of coordinate variable TOP from the y-coordinate value of coordinate variable BOTTOM. Then, the difference of these two quotients is stored in intercept variable "intercept".

If column scanning is performed, the y-coordinate value of coordinate variable BOTTOM is divided by the result of subtracting the x-coordinate value of coordinate variable TOP from the x-coordinate value of coordinate variable BOTTOM, and the y-coordinate value of coordinate variable TOP is divided by the result of subtracting the x-coordinate value of coordinate variable TOP from the x-coordinate value of coordinate variable BOTTOM, and then the difference between these two quotients is stored in slope variable SLOPE. Next, the result of multiplying x-coordinate of coordinate variable BOTTOM by y-coordinate of coordinate variable TOP is divided by the result of subtracting the x-coordinate value of coordinate variable TOP from the x-coordinate value of coordinate variable BOTTOM, and the result of multiplying y-coordinate of coordinate variable BOTTOM by x-coordinate of coordinate variable TOP is divided by the result of subtracting the x-coordinate value of coordinate variable TOP from the x-coordinate value of coordinate variable BOTTOM. Then, the difference of these two quotients is stored in intercept variable "intercept."

In this way, the presence/absence of the label is sensed. In addition, the label position information is sensed, that is, an extracting range (variables TOP and BOTTOM) for extracting the image data from the frame memory 62 so as to be parallel to the label is calculated as is the slope of the label (variable SLOPE).

The method implemented in step S3F will be explained which determines the label position and causes the label position indicator 65 to display the label position.

First, a method of determining the label position will be described with reference to FIGS. 9 through 13.

FIG. 9 shows a case where the label is sticking out rightward. It is assumed that points a and d indicated by coordinate variables a and d have been defined but coordinate variables b and c have not been defined. In this case, a straight line passing point a and point d indicated by coordinate variables a and d is determined. Then, a straight line crossing the straight line at right angles at point a is drawn in the label direction until it crosses the boundary of the frame memory 62 and the intersection is defined as a'. A straight line is drawn in the same manner for point d and the point at which the straight line crosses the boundary of the frame memory 62 is defined as d'. Here, depending on what part of the boundary of the frame memory 62 allows two intersections to be formed, the way the label sticks out is defined as follows:

Case (1) When two intersections are formed on the boundary straight line (0,0)-(x,0) of the frame memory 62:
The state of the label is defined as sticking out upward.

Case (2) when two intersections are formed on the boundary straight line (x,0)-(x,y) of the frame memory
The state of the label is defined as sticking out rightward.

Case (3) When two intersections are formed on the boundary straight line (0,y)-(x,y) of the frame memory 62;
The state of the label is defined as sticking out downward.

Case (4) when two intersections are formed on the boundary straight line (0,0)-(0,y) of the frame memory 62:
The state of the label is defined as sticking out leftward.

Case (5) when an intersection is formed on the boundary straight line (0,0)-(x,0) of the frame memory 62 and another intersection is formed on the boundary straight line (x,0)-(x,y) of the frame memory 62:
The state of the label is defined as sticking out to the upper right.

Case (6) when an intersection is formed on the boundary straight line (x,0)-(x,y) and another intersection is formed on the boundary straight line (0,y)-(x,y):
The state of the label is defined as sticking out to the lower right.

Case (7) When an intersection is formed on the boundary straight line (0,y)-(x,y) and another intersection is formed on the boundary straight line (0,0)-(0,y):
The state of the label is defined as sticking out to the lower left.

Case (8) When an intersection is formed on the boundary straight line (0,0)-(0,y) and another intersection is formed on the boundary straight line (0,0)-(x,o):
The state of the label is defined as sticking out to the upper left.

Because the example of FIG. 9 comes under case (2), it is judged that the label is sticking out rightward.

In FIG. 10, the label is sticking out to the upper right, with coordinate variables a and d defined and coordinate variables b and c not defined. Similar reasoning to that used in FIG. 9 shows that the example of FIG. 10 comes under case (5), so that it is judged that the label is sticking out to the upper right.

In FIG. 11, the label is sticking out downward, with coordinate variables a, d, b, and c all defined. In this case, depending on which of the four points indicated by the four coordinate variables are in contact with the boundary straight line of the frame memory 25 62, a judgment can be made as in FIG. 9.

In this case, when the image data is examined sequentially, starting at point $A_s$ to point A' on line A-A', no edge is sensed. As a result, the intersection A' of line A-A' and the boundary straight line of the frame 62 is defined as point m. When a perpendicular line is drawn from point m indicated by coordinate variable m to the line passing points e and g indicated by coordinate variables e and g, the intersection is point d" outside the screen. Therefore, coordinate variable d is the intersection of the straight line passing points e and g and the boundary straight line.

In FIG. 12, the label is sticking out to the lower right. In this case, coordinate variables b and c have not been defined but coordinate variables a and d have been defined and point d indicated by coordinate variable d is in contact with the boundary straight line of the frame memory 62. Similar reasoning applies even to this case and a judgment can be made as described above.

Figure 13:
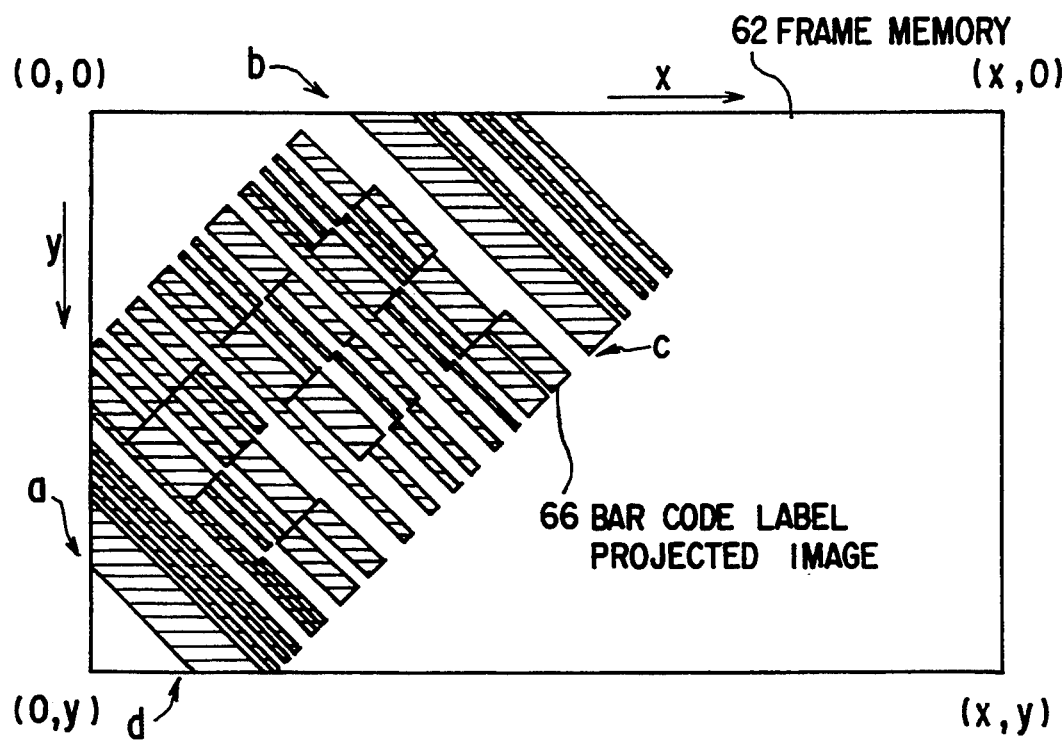
FIG. 13 is a view of a label image projected on the frame memory when sticking out in a complex manner.

In FIG. 13, the label is sticking out in a complex manner. In this case, coordinate variables a, d, b, and c have all been defined and three of the four points indicated by the four coordinate variables are in contact with the boundary straight line of the frame memory 62. Even in this case, similar reasoning applies and a judgment can be made as described above. Even when the label is sticking out in such a complex manner, a suitable arrangement of the label position indicator 65 makes it possible to tell the operator how the label is sticking out.

The display method of the label position indicator 65 will now be explained.

Figure 14:
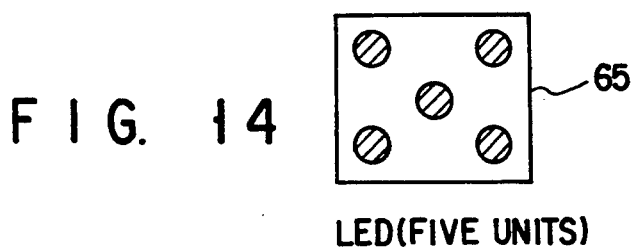
FIG. 14 is a view of an example of the label position indicator.

FIG. 14 shows an example of the label position indicator 65. As shown in the figure, the label position indicator 65 is made up of five LEDs arranged like the spots on a die. In this case, all the five LEDs are on (the on state is indicated by hatching. The same holds hereinafter).

Referring to FIGS. 15A through 15I, the operation of the label position indicator 65 using such five LEDs will be explained. In these figures, the position of the label with respect to the frame memory 62 corresponds to the on state of the five LEDs of the label position indicator 65 at that time.

Specifically, when having judged that the label is positioned at the center of the frame memory 62 as shown in FIG. 15A, that is, when coordinate variables a, d, b, and c have all been defined and none of the four points indicated by the four coordinate variables are in contact with the boundary straight line of the frame memory 62 as shown in FIG. 7, the data processing circuit 63 turns on the central one of the five LEDs of the label position indicator 65.

When it is judged that the label is sticking out to the upper right of the frame memory 62 (case (5)) as shown in FIG. 15B (although the sticking-out portion actually cannot be sensed on the surface of the frame memory, the entire label is drawn in order to show how the label is sticking out. The same holds true hereinafter), the upper right one of the five LEDs will come on.

when it is judged that the label is sticking out to the upper left of the frame memory 62 (case (8)) as shown in FIG. 15C, the upper left one of the five LEDs will come on.

When it is judged that the label is sticking out to the lower left of the frame memory 62 (case (7)) as shown in FIG. 15D, the lower left one of the five LEDs will come on.

When it is judged that the label is sticking out to the lower right of the frame memory 62 (case (6)) as shown in FIG. 15E, the lower right one of the five LEDs will come on.

When it is judged that the label is sticking out upward from the frame memory 62 (case (1)) as shown in FIG. 15F, the upper two of the five LEDs will come on.

When it is judged that the label is sticking out rightward from the frame memory 62 (case (2)) as shown in FIG. 15G, the right two of the five LEDs will come on.

When it is judged that the label is sticking out leftward from the frame memory 62 (case (4)) as shown in FIG. 15H, the left two of the five LEDs will come on.

When it is judged that the label is sticking out downward from the frame memory 62 (case (3)) as shown in FIG. 15I, the lower two of the five LEDs will come on.

When the label is outside the frame memory 62, none of the five LEDs will come on.

In this way, the shift direction judging section 63B of the data processing circuit 63 judges the result of the label sensing process at the position sensing section 63A. On the basis of the judgment result, the display control section 63C controls the label position indicator 65 to display the label position. Looking at the display, the operator can verify whether the bar-code symbol 1 is completely out of the field of view of the video camera 2 or is shifted rightward or leftward. This makes it possible to move a sheet or an article containing the label 1 to a proper position, regardless of differences between individuals.

Figures 16A, 16B:
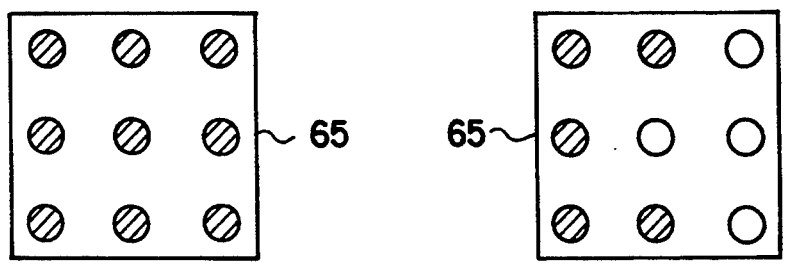
FIG. 16A is a view of another example of the label position indicator.
FIG. 16B shows the display state of the label position indicator of FIG. 16A corresponding to the state shown in FIG. 13.

While in this embodiment, five LEDs constitutes the label position indicator 65, nine LED may constitute the label position indicator as shown in FIG. 16A, to achieve a similar function. Use of the nine-LED indicator may enable more accurate display of the label position information. For example, when the label is sticking out in a complex manner as shown in FIG. 13, it is possible to let the operator know the state by displaying the pattern as shown in FIG. 16B. It will be appreciated that LEDs whose number is smaller or larger than 5 or 9 may constitute the label position indicator 65.

FIG. 17 shows another example of the label position indicator 65. A 7-segment LED numeric display element, that is, an element capable of displaying numbers ranging from 0 to 9 as shown in the figure, is used as the label position indicator 65.

When such an element is used, various states can be displayed as shown in FIGS. 18A through 18I. For example, when the label is positioned at the center of the frame memory 62, the central segment of the LED numeric display element will come on (FIG. 18A). When the label is sticking out to the upper right of the frame memory 62 (case (5)), two segments, the upper right and the top, of the LED numeric display element will come on (FIG. 18B). The same holds true for the other states, and the segments of the LED numeric display elements come on as shown in FIGS. 18C through 18I.

As described above, the label position indicator 65 may be composed of an LED numeric display element. In this case, the error message indicator provided on the bar-code symbol reading apparatus may also serve as the LED numeric display element.

FIG. 19 shows another example of the label position indicator 65. In this example, a unit capable of displaying characters is used as the label position indicator 65. For example, when the label is positioned at the center of the frame memory 62, the message "LABEL: CENTER POSITION" appears. When the label is sticking out to the upper right of the frame memory 62, the message "LABEL: RIGHT UP POSITION" appears. When the label is sticking out upward from the frame memory 62, the message "LABEL: UP POSITION" appears. Although the label position indicator 65 using an LCD is a little expensive as compared with an indicator using an LED, it provides easy-to-understand display.

FIG. 20 shows another example of the label position indicator 65. In this example, 16 special LEDs (8 rectangular LEDs 65A1 through 65A8 and 8 arrow LEDs 65B1 through 65B8) are arranged as shown in the figure, to form the label position indicator 65.

The operation of the label position indicator 65 using such 16 LEDs will be described below.

When the label is positioned at the center of the frame memory 62, the 8 central rectangular LEDs 65A1 through 65A8 of the 16 LEDs will come on as shown in FIG. 21 A.

When the label is sticking out to the upper right of the frame memory 62 (case (5)), three LEDs $65_{A2}$, $65_{A6}$, and $65_{B6}$ of the 16 LEDs will come on so that the arrow may point to the lower left as shown in FIG. 21B.

Figure 21C:
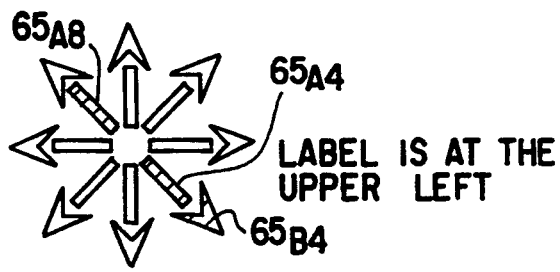

When the label is sticking out to the upper left of the frame memory 62 (case (8)), three LEDs $65_{A8}$, $65_{A4}$, and $65_{B4}$ of the 16 LEDs will come on so that the arrow may point to the lower right as shown in FIG. 21C.

Figure 21F:
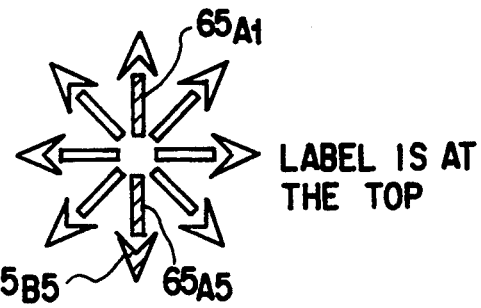
Figure 21D:
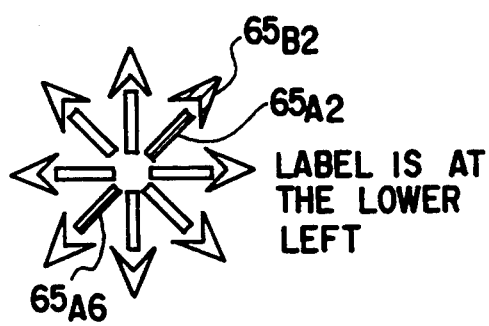

When the label is sticking out to the lower left of the frame memory 62 (case (7)), three LEDs $65_{A6}$, $65_{A2}$, and $65_{B2}$ of the 16 LEDs will come on so that the arrow may point to the upper right as shown in FIG. 21D.

Figure 21G:
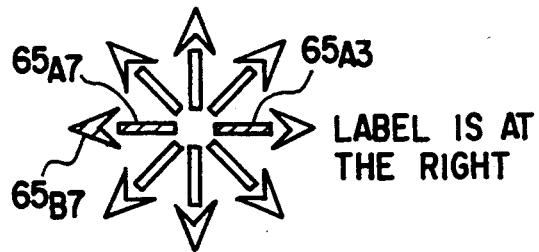
Figure 21H:
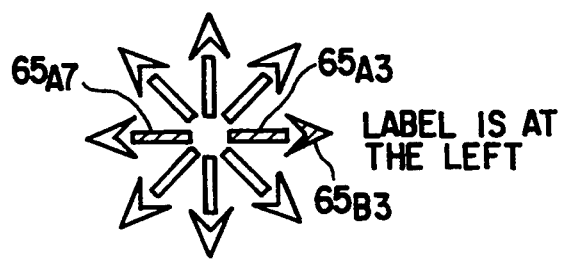
Figure 21E:
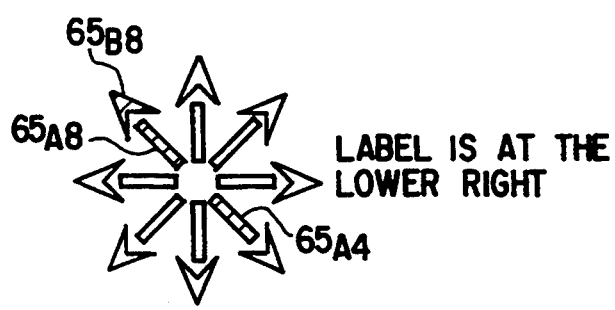

When the label is sticking out to the lower right of the frame memory 62 (case (6)), three LEDs $65_{A4}$, $65_{A8}$, and $65_{B8}$ of the 16 LEDs will come on so that the arrow may point to the upper left as shown in FIG. 21E.

When the label is sticking out upward from the frame memory 62 (case (1)), three LEDs $65_{A1}$, $65_{A5}$, and $65_{B5}$ of the 16 LEDs will come on so that the arrow may point down as shown in FIG. 21F.

When the label is sticking out rightward from the frame memory 62 (case (2)), three LEDs $65_{A3}$, $65_{A7}$, and $65_{B7}$ of the 16 LEDs will come on so that the arrow may point left as shown in FIG. 21G.

When the label is sticking out leftward from the frame memory 62 (case (4)), three LEDs $65_{A7}$, $65_{A3}$, and $65_{B3}$ of the 16 LEDs will come on so that the arrow may point right as shown in FIG. 21H.

Figure 21I:
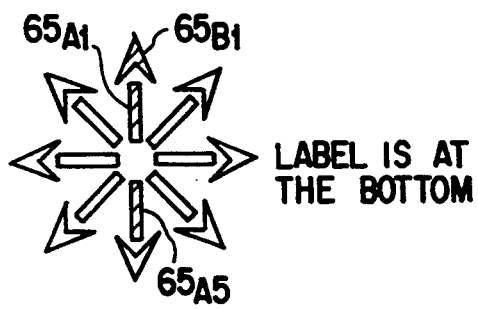

When the label is sticking out downward from the frame memory 62 (case (3)), three LEDs $65_{A5}$, $65_{A1}$, and $65_{B1}$ of the 16 LEDs will come on so that the arrow may point up as shown in FIG. 21I.

When the label is outside the frame memory 62, none of the 16 LEDs will come on.

In this example, the label position indicator 65 shows in which direction the label should be moved, not how the label is sticking out.

In this way, the label position indicator 65 may be implemented in various arrangements.

As described so far, the data processing circuit 63 judges the result of the label sensing process and causes the label position indicator 65 to display the label position. Looking at this display, the operator can confirm whether the bar-code symbol 1 is completely out of the field of view of the video camera 2, or is shifted rightward or leftward. This makes it possible to move a sheet or an article containing the bar-code symbol 1 to a proper position, regardless of differences between individuals.

The data processing circuit 63 may be composed of a CPU, a program memory, a work memory, and a high-speed computing circuit. Use of a very high-speed element, such as a DSP (digital signal processor), enables the DSP to serve both as a CPU and a high-speed computing circuit.

An area sensor, such as a two-dimensional CCD or a camera tube, is generally used as the video camera 2. A method of imaging a bar-code symbol is not limited to a video camera. For instance, it may be a combination of a one-dimensional imaging element and a one-dimensional scanning mechanism or a combination of an optoelectric sensor and a two-dimensional scanning mechanism.

While in the above embodiment, a bar code of the PDF-417 code system is used, other two-dimensional bar codes such as CODE 49, CODE 16k, or DATA CODE or conventional one-dimensional bar codes such as JAN or ITF may be used. For example, with DATA CODE, two-dimensional bar code, label sensing is achieved by sensing the L-shaped outer frame, and the label position can be determined from the positional relationship between the label and the frame memory. As for a conventional one-dimensional bar code, label sensing is achieved by sensing two or more parallel bars and the label position can be determined from the positional relationship between the label and the frame memory, as disclosed in Jpn. Pat. Appln. KOKAI Publication No. 2-23483.

In the above description, if there is no label in steps S3 and S4 of FIG. 5, control is returned to step S1 and the preprocessing routine is called. If a label is present, the movement sensing routine is called (step S5). That is, although being shifted upward, downward, rightward, or leftward, if only a label is present, control is passed to step S5. This is because even if the label is shifted slightly upward, downward, rightward, or leftward, a two-dimensional bar code symbol of the PDF-417 code system or DATA CODE with an error-correction function may sometimes be read. When the bar-code symbol could not be read (normally, it is judged from the error message output or the fact that the read end buzzer did not sound), the operator looks at the label position indicator 65 and verifies that the label is shifted upward, downward, rightward, or leftward. Then, he moves the sheet or the article containing the bar-code symbol 1 to a proper position. That is, the label position indicator 65 is used to verify the label position when the bar-code symbol cannot be read.

Figure 22:
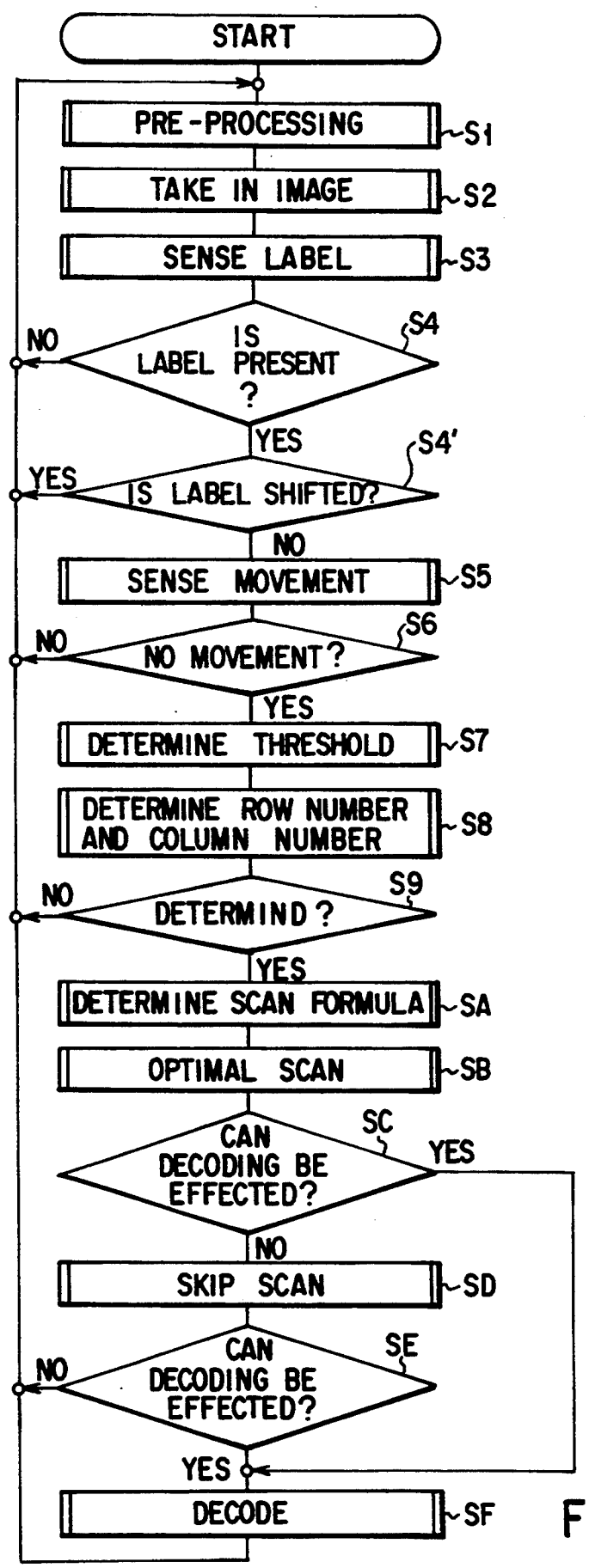
FIG. 22 is a general flowchart for explaining a modification of the first embodiment.

On the other hand, in steps S3 and S4 of FIG. 5, even if a label is present, when the label is shifted in any direction of up, down, right, and left, it is possible to return control to step 1. In this case, while looking at the label position indicator 65, the operator moves the sheet or the article containing the bar-code symbol 1 to a proper position. After the sheet or the article has been moved to the proper position (when the central one of the five LEDs comes on as shown in FIG. 15A, or a position where coordinate variables a, d, b, and c have all been defined and none of the four points indicated by the four coordinate variables are in contact with the boundary straight line of the frame memory 62 as shown in FIG. 7), an automatic moving sensing routine is called (step S5). The algorithm for this processing is shown in the flowchart in FIG. 22. As can be seen from the flowchart, it is possible to read the information on the bar-code symbol 1 correctly.

Taking into account the amount of shift of the label in steps S3 and S4 of FIG. 5, control may be returned to step S1 when the label is shifted significantly, and only when the label is shifted slightly, control may be passed to step S5. For example, when coordinate variables a, d, b, and c have all been defined and none of the four points indicated by the four coordinate variables are in contact with the boundary straight line of the frame memory 62 as shown in FIG. 7, or when up to two points are in contact with the boundary straight line as shown in FIG. 11 (FIG. 11 shows an example of one point being in contact with the boundary straight line), control is passed to step S5. When none of coordinate variables a, d, b, and c have been defined as shown in FIG. 10, control is returned to step S1.

A changeover switch may be provided so that the label position indicator 65 may produce a legible display, depending on the horizontal or vertical placement of the decoder box 6. The placement state of the decoder box 6 may be sensed by suitable sensing means and automatically switch the changeover switch.

[Second embodiment]

Figure 23:
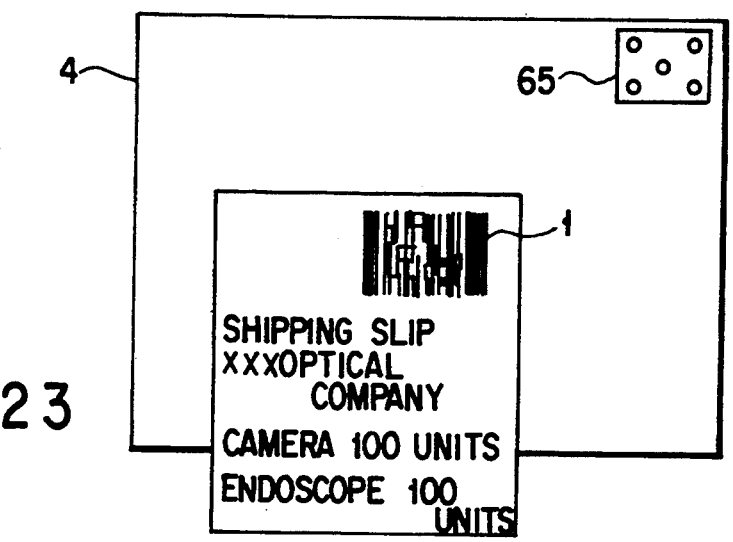
FIG. 23 is a second embodiment of the present invention.

FIG. 23 shows a second embodiment of the present invention. The second embodiment is basically the same as the first embodiment except for the location of the label position indicator 65. Specifically, while the first embodiment has the label position indicator 65 attached to the decoder box 6, the second embodiment has the label position indicator 65 provided on the base plate 4 of the camera stand 5.

With this configuration, the operator can place a sheet or a article containing a bar-code symbol 1 on the base plate 4, while looking at the label position indicator 65.

[Third embodiment]

Figure 24:
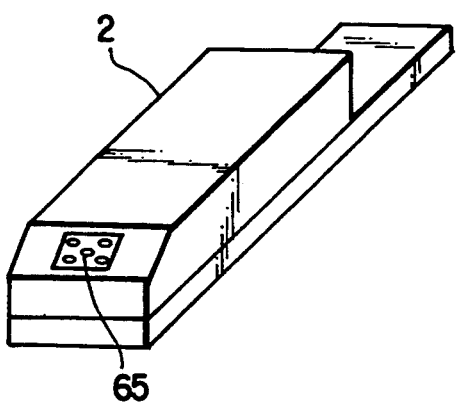
FIG. 24 is a third embodiment of the present invention.

FIG. 24 shows a third embodiment. The third embodiment is basically the same as the first embodiment except for the location of the label position indicator 65. Specifically, in the third embodiment, the label position indicator 65 is provided at the tip of the video camera 2.

With this configuration, the operator can place a sheet or a article containing a bar-code symbol 1 on the base plate 4, while looking at the label position indicator 65 provided on the video camera 2 above the base plate 4.

[Fourth embodiment]

Figure 25:
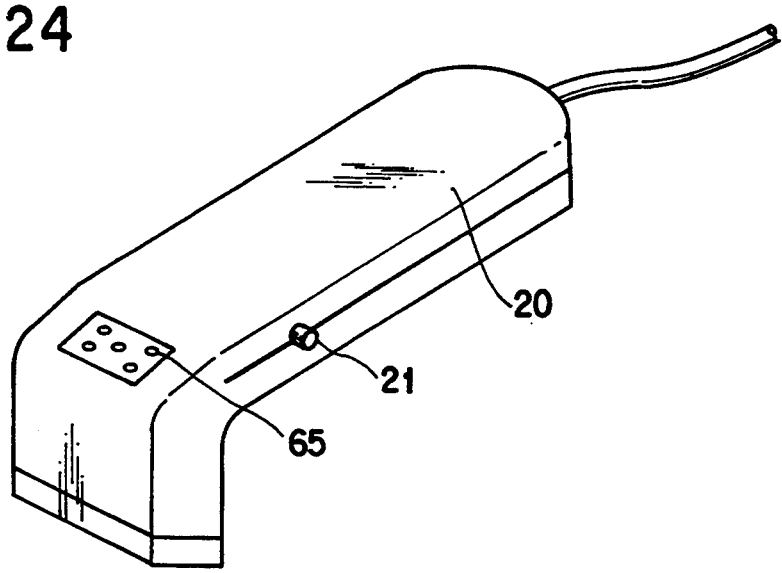
FIG. 25 is a fourth embodiment of the present invention.

FIG. 25 shows a fourth embodiment. In the fourth embodiment, the label position indicator 65 is provided for a handy scanner 20.

With this type of scanner, the reading section completely covers the bar-code symbol 1, so that the operator cannot see at all how the bar-code symbol 1 is inclined and where it is sticking out. Therefore, it can be said that it is important to provide the label position indicator 65 on the back of the handy scanner and inform the operator of the position of the bar-code symbol 1.

Figure 26:
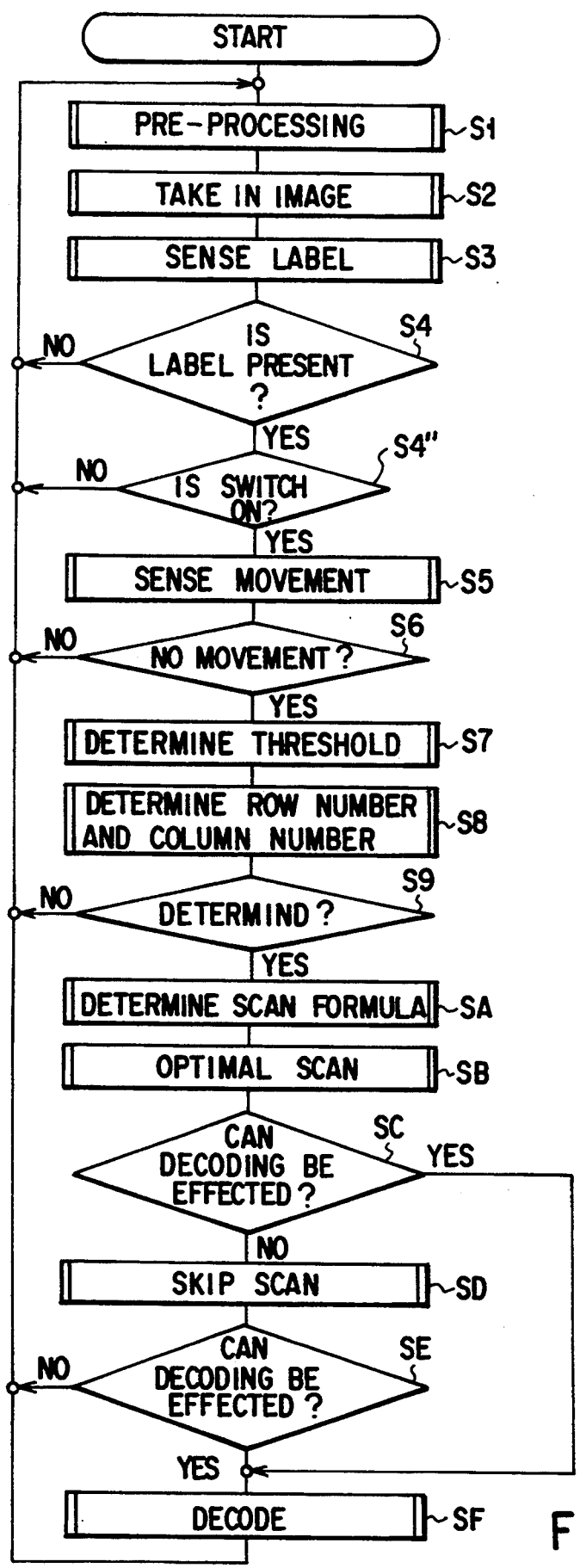
FIG. 26 is a general flowchart for describing the operation of the fourth embodiment.

In the handy type, the function of reporting the read start to the data processing circuit 63 of the handy scanner, such as a read start switch 21, may be provided. Specifically, when looking at the label position indicator 65 and verifying that the bar-code symbol 1 is positioned at the center of the frame memory 62, the operator presses the read start switch 21. Receiving the read start signal, the data processing circuit 63 starts reading. In this case, the data processing circuit 63 operates, following the flowchart shown in FIG. 26.

In this way, when the bar-code symbol 1 is at the center of the frame memory 62, that is, when the bar-code symbol can be read completely, the data processing circuit 63 is allowed to start reading.

The decoder box 6 may be built in the handy scanner 20 or be separated from the handy scanner as shown in the first embodiment.

While in the first through fourth embodiments, the shift of the bar-code symbol 1 determined at the shift direction judging section 63B is displayed, the bar-code symbol 1 may be automatically moved to a proper position on the basis of the result of the shift judgment.

As described above in detail, according to the present invention, it is possible to provide a two-dimensional bar-code symbol reading apparatus capable of judging whether or not a bar-code symbol recorded on a sheet, an article, or the like, is completely within the visual field of a video camera, regardless of differences between individuals.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A bar-code symbol reading apparatus comprising:
 imaging means for imaging a bar-code symbol, the bar code symbol including bars and spaces, and for producing image information;
 memory means for storing an image information on a bar-code symbol from said imaging means;
 position sensing means for sensing a position of the bar-code symbol imaged by said imaging means in an imaging area of said imaging means on the basis of an output of said memory means, said position sensing means including coordinate sensing means for sensing four specified corners of a bar-code symbol; and
 direction judging means for judging a direction of shift of the bar-code symbol imaged by said imaging means from the imaging area of said imaging means, on the basis of an output of said position sensing means; and
 wherein said direction judging means includes judging means for judging the direction of shift on the basis of coordinates of two of said sensed specified corners, when said coordinate sensing means has not sensed all coordinates of the four specified corners.

2. The apparatus according to claim 1, wherein said judging means of said direction judging means includes:
 slope sensing means for sensing a slope of the bar code symbol on the basis of the coordinates of two specified corners sensed by said coordinate sensing means; and
 shift direction judging means for judging the direction of shift on the basis of positions of two intersections of two straight lines drawn from the coordinates of the two specified corners in direction of the slope sensed by said slope sensing means and four straight lines, up, down, right, and left, defining a boundary of the imaging area.

3. The apparatus according to claim 2, wherein said shift direction judging means includes means for:
 judging that the direction of shift is upward when the positions of the two intersections are on a straight line defining a top boundary of the imaging area;
 judging that the direction of shift is rightward when the positions of the two intersections are on a straight line defining a right boundary of the imaging area;
 judging that the direction of shift is downward when the positions of the two intersections are on a straight line defining a bottom boundary of the imaging area;

judging that the direction of shift is leftward when the positions of the two intersections are on a straight line defining a left boundary of the imaging area;

judging that the direction of shift is to upper right when one of the positions of the two intersections is on a straight line defining the top boundary of the imaging area and the other is on a straight line defining the right boundary of the imaging area;

judging that the direction of shift is to lower right when one of the positions of the two intersections is on a straight line defining the right boundary of the imaging area and the other is on a straight line defining the bottom boundary of the imaging area;

judging that the direction of shift is to lower left when one of the positions of the two intersections is on a straight line defining the bottom boundary of the imaging area and the other is on a straight line defining the left boundary of the imaging area; and judging that the direction of shift is to upper left when one of the positions of the two intersections is on a straight line defining the top boundary of the imaging area and the other is on a straight line defining the left boundary of the imaging area.

4. The apparatus according to claim 1, further comprising display means for displaying the direction of shift determined by said direction judging means.

5. The apparatus according to claim 4, wherein said display means includes five LEDs arranged like the spots on a die.

6. The apparatus according to claim 4, wherein said display means includes nine LEDs arranged in three rows and three columns at regular intervals.

7. The apparatus according to claim 4, wherein said display means includes an 8-shaped seven-segment LED display element.

8. The apparatus according to claim 4, wherein said display means includes a liquid crystal display for character representation.

9. The apparatus according to claim 4, further comprising a rack for housing at least said memory means, said position sensing means, and said direction judging means, and wherein said display means is provided on said rack.

10. The apparatus according to claim 4, further comprising a base plate on which a bar-code symbol is placed for imaging by said imaging means, and wherein said display means is provided on said base plate.

11. The apparatus according to claim 4, wherein said display means is provided on said imaging means.

12. The apparatus according to claim 4, further comprising a rack for housing said imaging means, said memory means, said position sensing means, and said direction judging means, and wherein said display means is provided on said rack.

13. The apparatus according to claim 1, further comprising decoding means for interpreting contents of the bar-code symbol on the basis of the image information on the bar-code symbol stored in said memory means, when said direction judging means has judged that the bar-code symbol has not been shifted at all.

14. The apparatus according to claim 4, further comprising:
instructing means operable to instruct interpretation of contents of an imaged bar-code symbol; and
decoding means for interpreting the contents of the bar-code symbol on the basis of the image information on the bar-code symbol stored in said memory means, in response to operation of said instructing means.

15. The apparatus according to claim 1, further comprising display means for displaying a direction in which the bar-code symbol should be moved on the basis of the direction of shift determined by said direction judging means.

16. The apparatus according to claim 15, further comprising:
instructing means operable to instruct interpretation of contents of an imaged bar-code symbol; and
decoding means for interpreting the contents of the bar-code symbol on the basis of the image information on the bar-code symbol stored in said memory means, in response to operation of said instructing means.

17. A bar-code symbol reading apparatus comprising:
imaging means for imaging a bar-code symbol, the bar bode symbol including bars and spaces, and for producing image information;
memory means for storing an image information on a bar-code symbol from said imaging means;
position sensing means for sensing a position of the bar-code symbol imaged by said imaging means in an imaging area of said imaging means on the basis of an output of said memory means, said position sensing means including coordinate sensing means for sensing four specified points of a bar-code symbol; and
direction judging means for judging a direction of shift of the bar-code symbol imaged by said imaging means from the imaging area of said imaging means, on the basis of an output of said position sensing means; and
wherein said direction judging means includes judging means for judging the direction of shift on the basis of coordinates of two of said sensed specified points, when said coordinate sensing means has not sensed all coordinates of the four specified points.

18. The apparatus according to claim 17, wherein said judging means of said direction judging means includes:
slope sensing means for sensing a slope of the bar code symbol on the basis of the coordinates of two specified points sensed by said coordinate sensing means; and
shift direction judging means for judging the direction of shift on the basis of positions of two intersections of two straight lines drawn from the coordinates of the two specified points in direction of the slope sensed by said slope sensing means and four straight lines, up, down, right, and left, defining a boundary of the imaging area.

19. The apparatus according to claim 18, wherein said shift direction judging means includes means for:
judging that the direction of shift is upward when the positions of the two intersections are on a straight line defining a top boundary of the imaging area;
judging that the direction of shift is rightward when the positions of the two intersections are on a straight line defining a right boundary of the imaging area;
judging that the direction of shift is downward when the positions of the two intersections are on a straight line defining a bottom boundary of the imaging area;
judging that the direction of shift is leftward when the positions of the two intersections are on a straight line defining a left boundary of the imaging area;

judging that the direction of shift is to upper right when one of the positions of the two intersections is on a straight line defining the top boundary of the imaging area and the other is on a straight line defining the right boundary of the imaging area;

judging that the direction of shift is to lower right when one of the positions of the two intersections is on a straight line defining the right boundary of the imaging area and the other is on a straight line defining the bottom boundary of the imaging area;

judging that the direction of shift is to lower left when one of the positions of the two intersections is on a straight line defining the bottom boundary of the imaging area and the other is on a straight line defining the left boundary of the imaging area; and judging that the direction of shift is to upper left when one of the positions of the two intersections is on a straight line defining the top boundary of the imaging area and the other is on a straight line defining the left boundary of the imaging area.

20. The apparatus according to claim 17, further comprising display means for displaying the direction of shift determined by said direction judging means.

21. The apparatus according to claim 20, further comprising:

instructing means operable to instruct interpretation of contents of an imaged bar-code symbol; and decoding means for interpreting the contents of the bar-code symbol on the basis of the image information on the bar-code symbol stored in said memory means, in response to operation of said instructing means.

22. A bar-code symbol reading apparatus comprising:

imaging means for imaging a bar-code symbol, the bar code symbol including bars and spaces, and for producing image information;

memory means for storing an image information on a bar-code symbol from said imaging means;

position sensing means for sensing a position of the bar-code symbol imaged by said imaging means in an imaging area of said imaging means on the basis of an output of said memory means, said position sensing means including coordinate sensing means for sensing four specified corners of a bar-code symbol;

direction judging means for judging a direction of shift of the bar-code symbol imaged by said imaging means from the imaging area of said imaging means, on the basis of an output of said position sensing means;

wherein said direction judging means includes judging means for judging the direction of shift on the basis of coordinates of two of said sensed specified corners, when said coordinate sensing means has not sensed all coordinates of the four specified corners;

a base plate on which a bar-code symbol is placed for imaging by said imaging means; and display means, provided on said base plate, for displaying the direction of shift determined by said direction judging means.

* * * * *